US011924699B2

(12) United States Patent
Ly et al.

(10) Patent No.: US 11,924,699 B2
(45) Date of Patent: Mar. 5, 2024

(54) NR SIDELINK INTRA-CELL RELAY MEASUREMENT

(71) Applicant: QUALCOMM Incorporated, San Diego, CA (US)

(72) Inventors: Hung Dinh Ly, San Diego, CA (US); Wanshi Chen, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 17/468,479

(22) Filed: Sep. 7, 2021

(65) Prior Publication Data

US 2022/0078685 A1 Mar. 10, 2022

Related U.S. Application Data

(60) Provisional application No. 63/075,434, filed on Sep. 8, 2020.

(51) Int. Cl.
*H04W 36/06* (2009.01)
*H04L 5/00* (2006.01)
*H04L 27/26* (2006.01)
*H04W 36/00* (2009.01)

(52) U.S. Cl.
CPC ........... *H04W 36/06* (2013.01); *H04L 5/0051* (2013.01); *H04L 27/26025* (2021.01); *H04W 36/0058* (2018.08)

(58) Field of Classification Search
CPC ............. H04W 36/06; H04W 36/0058; H04W 36/0085; H04W 36/03; H04W 88/04; H04W 40/22; H04L 5/0051; H04L 27/26025; H04L 27/2647; H04L 27/261; H04B 7/15528; H04B 17/24; H04B 17/327; H04B 17/382
See application file for complete search history.

(56) References Cited

U.S. PATENT DOCUMENTS

| 2011/0261747 A1* | 10/2011 | Wang ................... | H04W 40/22 370/315 |
| 2012/0044836 A1* | 2/2012 | Sivavakeesar ........ | H04W 24/02 370/255 |

(Continued)

*Primary Examiner* — Quoc Thai N Vu
(74) *Attorney, Agent, or Firm* — Procopio, Cory, Hargreaves & Savitch LLP

(57) ABSTRACT

Method and apparatus for configuring a UE with a relay measurement configuration for measuring one or more candidate relays in preparation of switching to a target relay. The apparatus receives, from a source relay, a candidate relay configuration. The candidate relay configuration including information of candidate relays and a relay measurement configuration. The apparatus measures a reference signal of the source relay and each of the candidate relays based on the candidate relay configuration. The apparatus transmits, to the source relay, a measurement report of the reference signal of the subset of candidate relays. The apparatus establishes a connection with a subset of candidate relays. The apparatus receives, from the source relay, a relay switch command to switch to a target relay from the subset of candidate relays.

27 Claims, 15 Drawing Sheets

(56) References Cited

U.S. PATENT DOCUMENTS

| | | | | |
|---|---|---|---|---|
| 2015/0304902 A1* | 10/2015 | Yu | ........................ | H04W 36/03 |
| | | | | 455/436 |
| 2019/0182000 A1* | 6/2019 | Futaki | ................... | H04W 76/27 |
| 2019/0320361 A1* | 10/2019 | Uchiyama | ............. | H04W 88/04 |
| 2020/0404690 A1* | 12/2020 | Lee | ................... | H04W 72/1273 |

* cited by examiner

NR SIDELINK INTRA-CELL RELAY MEASUREMENT

CROSS REFERENCE TO RELATED APPLICATION(S)

This application claims the benefit of and priority to U.S. Provisional Application Ser. No. 63/075,434, entitled "NR Sidelink Intra-Cell Relay Measurement" and filed on Sep. 8, 2020, which is expressly incorporated by reference herein in its entirety.

TECHNICAL FIELD

The present disclosure relates generally to communication systems, and more particularly, to a configuration for sidelink intra-cell relay measurement.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a user equipment (UE). The device may be a processor and/or a modem at a UE or the UE itself. The apparatus receives, from a source relay, a candidate relay configuration, the candidate relay configuration including information of candidate relays and a relay measurement configuration. The apparatus measures a reference signal of the source relay and each of the candidate relays based on the candidate relay configuration. The apparatus transmits, to the source relay, a measurement report of the reference signal of the subset of candidate relays. The apparatus establishes a connection with a subset of candidate relays. The apparatus receives, from the source relay, a relay switch command to switch to a target relay from the subset of candidate relays.

In an aspect of the disclosure, a method, a computer-readable medium, and an apparatus are provided. The apparatus may be a device at a UE or a base station. The device may be a processor and/or a modem at a UE or base station or the UE or base station itself. The apparatus transmitting, to a UE, a candidate relay configuration, the candidate relay configuration including information of candidate relays and a relay measurement configuration. The apparatus receives, from the UE, a measurement report of a subset of candidate relays. The apparatus transmits, to the UE, a relay switch command to switch to a target relay from the subset of candidate relays.

In an aspect of the disclosure, a method, a computer-readable medium, and an apparatus are provided. The apparatus may be a device at a base station. The device may be a processor and/or a modem at a base station or the base station itself. The apparatus configures a candidate relay configuration including information of candidate relays and a relay measurement configuration. The apparatus transmits, to a source relay, the candidate relay configuration. The apparatus receives, from the source relay, a measurement report of reference signals of a subset of candidate relays. The apparatus selects a target relay from the subset of candidate relays based on the measurement report. The apparatus transmits, to the source relay, a relay switch command for a UE to switch to the target relay.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
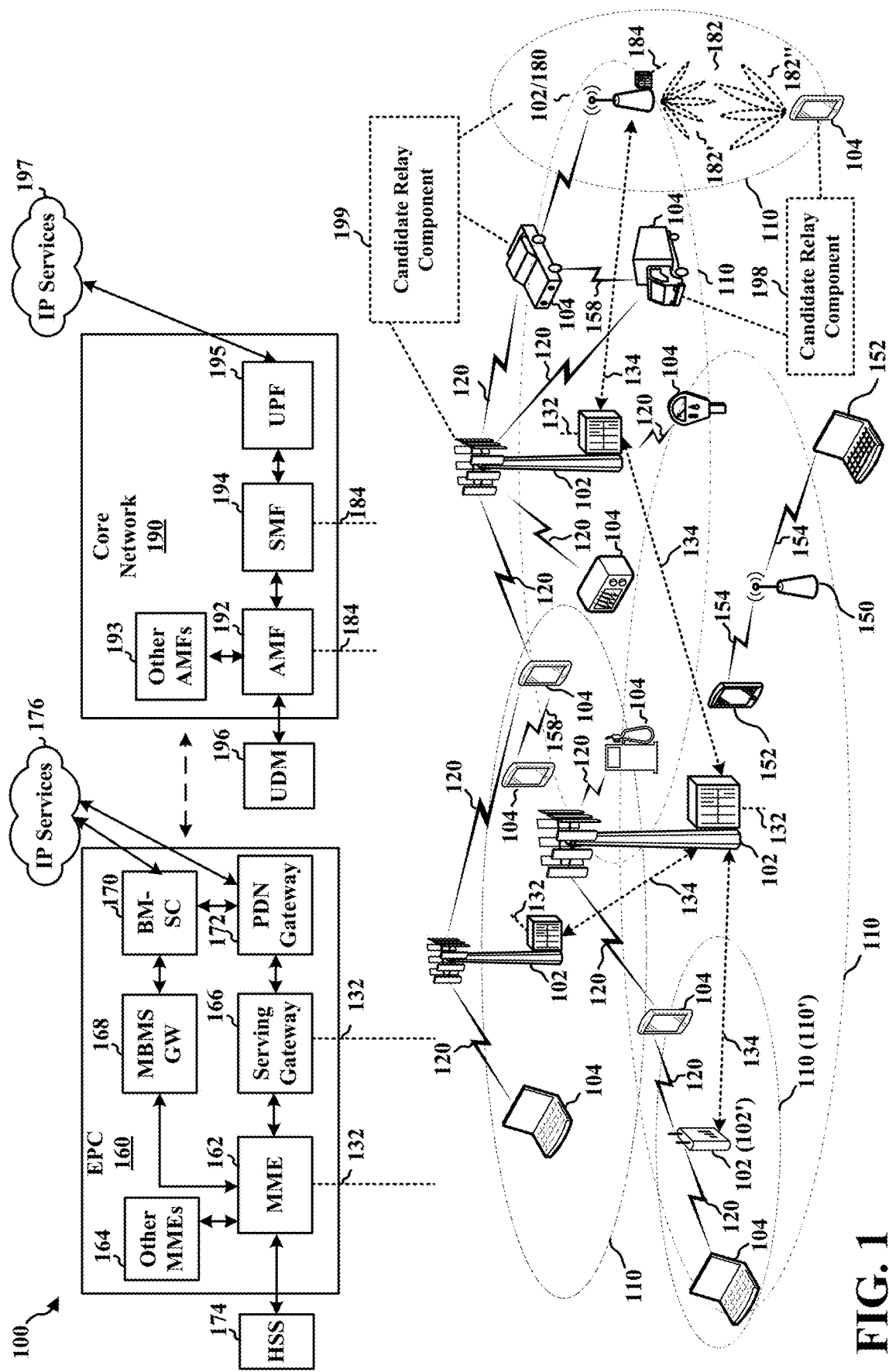
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to perform measurement of one or more candidate relays in preparation of switching to a target relay. For example, the UE 104 may comprise a candidate relay component 198 configured to receive a candidate relay configuration having at least a relay measurement configuration. The UE 104 may receive, from a source relay, a candidate relay configuration, the candidate relay configuration including information of candidate relays and a relay measurement configuration. The UE 104 may measure a reference signal of the source relay and each of the candidate relays based on the candidate relay configuration. The UE 104 may transmit, to the source relay, a measurement report of the reference signal of the subset of candidate relays. The UE 104 may establish a connection with a subset of candidate relays. The UE 104 may receive, from the source relay, a relay switch command to switch to a target relay from the subset of candidate relays.

Referring again to FIG. 1, in certain aspects, the source relay (e.g., UE 104 or base station 102/180) may be configured to transmit a candidate relay configuration including at least a relay measurement configuration. For example, the source relay may comprise a candidate relay component (e.g., 198 or 199) configured to transmit the candidate relay configuration including at least the relay measurement configuration to a UE 104. The source relay may transmit, to a UE 104, a candidate relay configuration, the candidate relay configuration including information of candidate relays and a relay measurement configuration. The source relay may receive, from the UE 104, a measurement report of a subset of candidate relays. The source relay may transmit, to the UE 104, a relay switch command to switch to a target relay from the subset of candidate relays.

Referring again to FIG. 1, in certain aspects, the base station 180 may be configured to configure a candidate relay configuration including at least a relay measurement configuration. For example, the base station 180 may comprise a candidate relay component 199 configured to transmit the candidate relay configuration to a source relay. The base station 180 may configure a candidate relay configuration including information of candidate relays and a relay measurement configuration. The base station 180 may transmit, to a source relay, the candidate relay configuration. The base station 180 may receive, from the source relay, a measurement report of reference signals of a subset of candidate relays. The base station 180 may select a target relay from the subset of candidate relays based on the measurement report. The base station 180 may transmit, to the source relay, a relay switch command for a UE to switch to the target relay.

Although the following description may be focused on 5G NR, the concepts described herein may be applicable to other similar areas, such as LTE, LTE-A, CDMA, GSM, and other wireless technologies.

Figure 2:
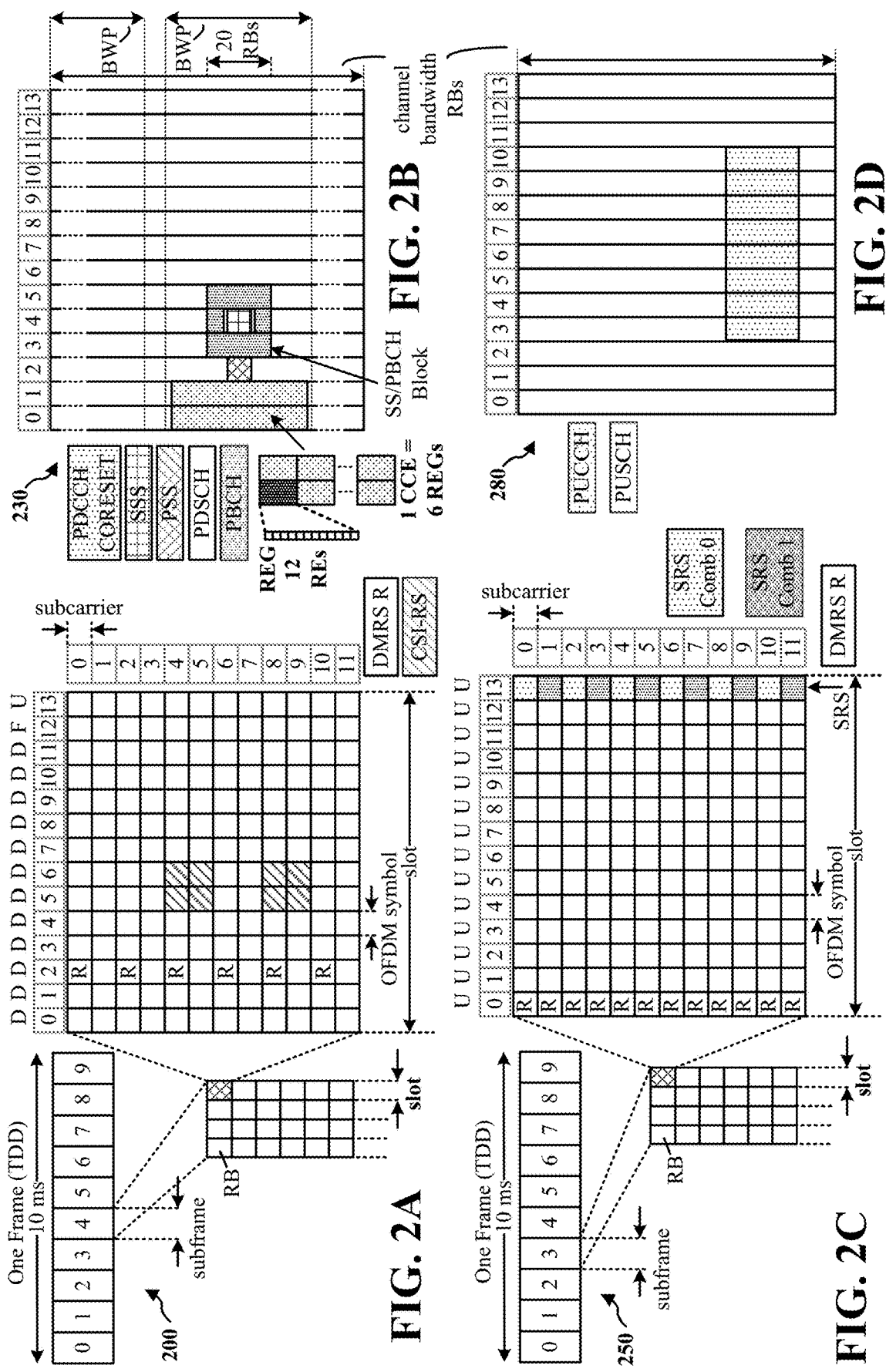
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15[kHz]$ | Cyclic pre fix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*kHz$, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
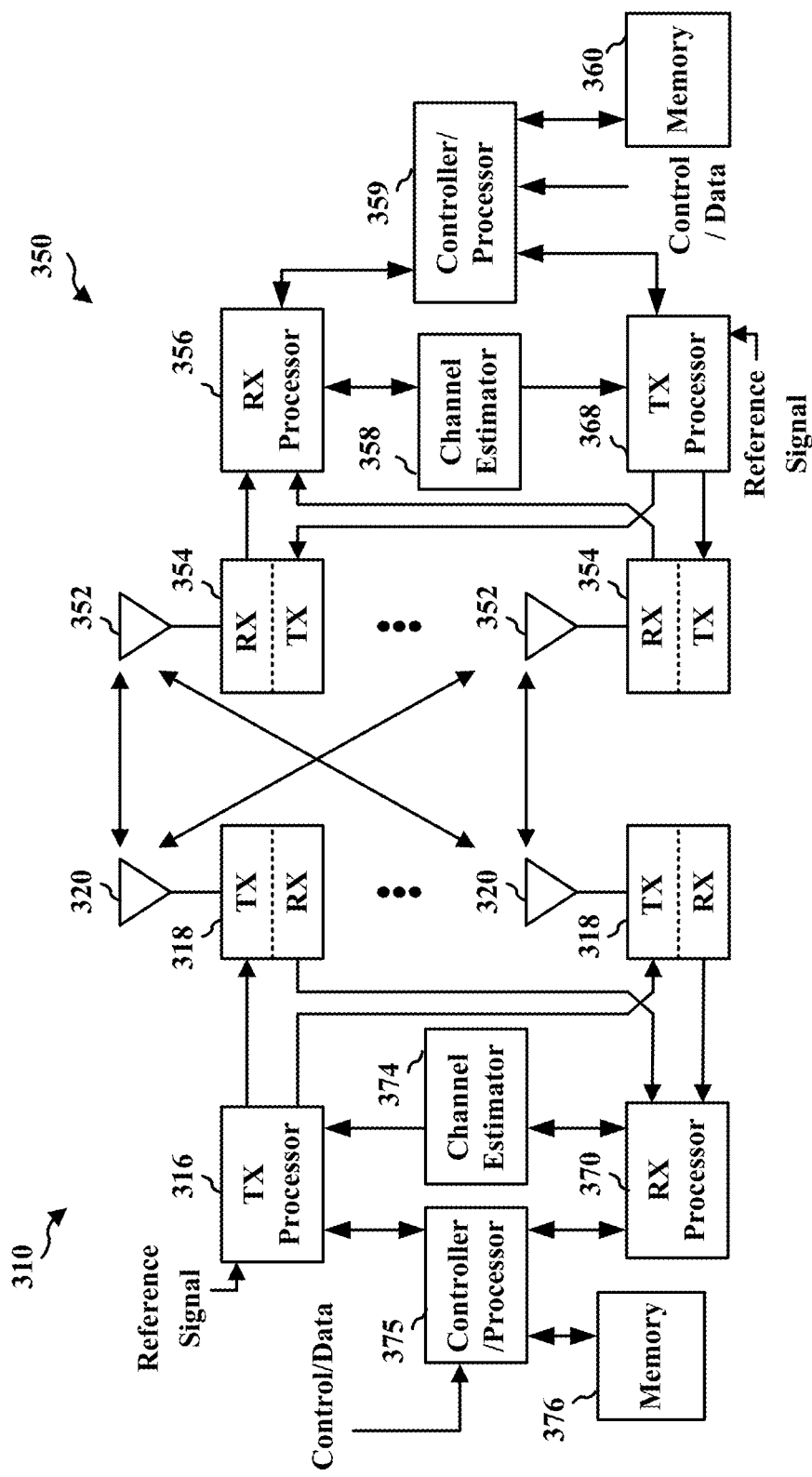
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 or 199 of FIG. 1.

At least one of the TX processor 316, the RX processor 370, and the controller/processor 375 may be configured to perform aspects in connection with 198 or 199 of FIG. 1.

Figure 4:
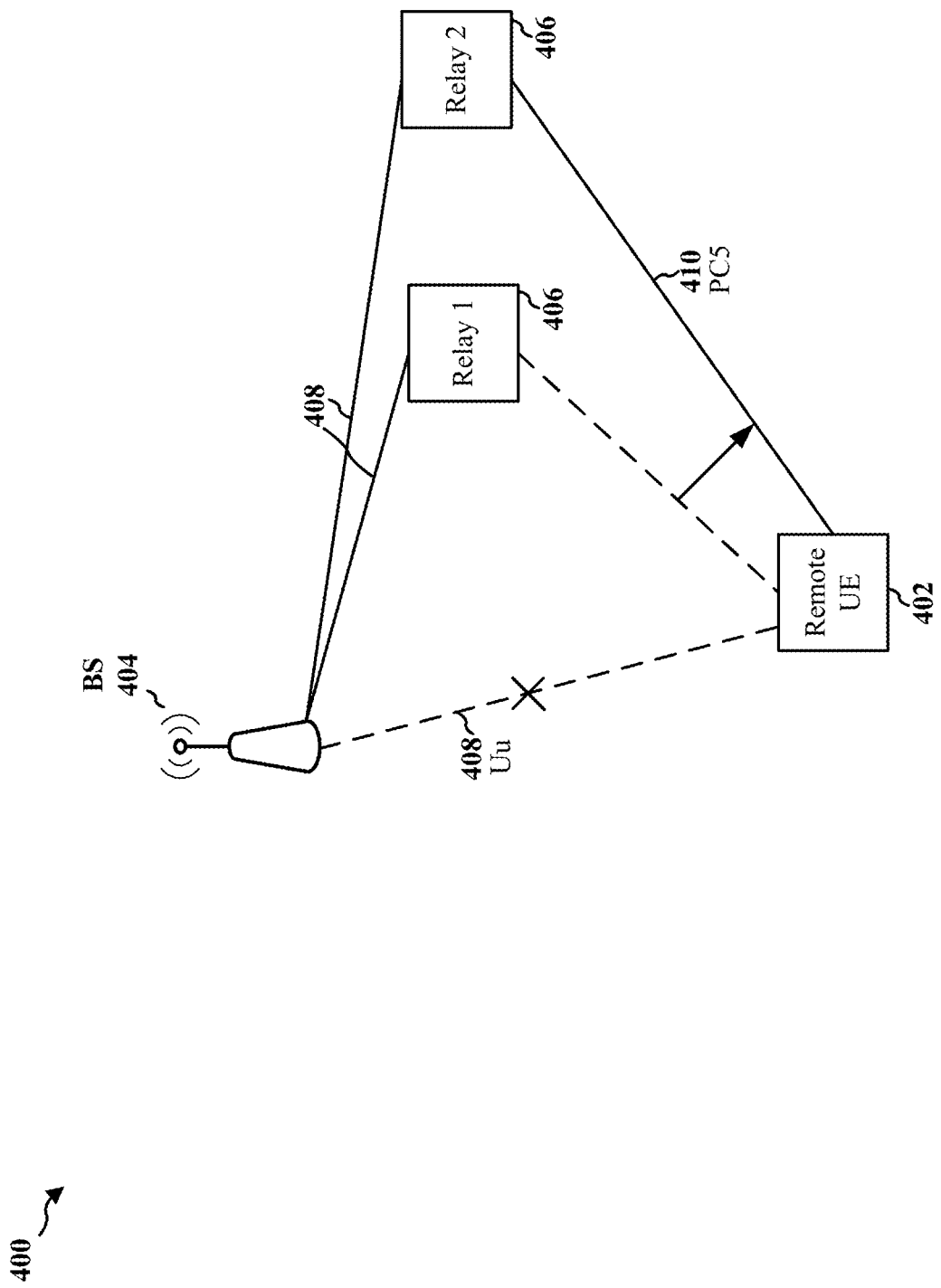
FIG. 4 illustrates an example of relay switching in a wireless communication system.

In wireless communication systems, a UE may lose coverage due to as losing the connection or Uu link with a base station. In some instances, one or more relays with a Uu connection with the base station may be within range of the UE that lost coverage. The relay and the UE may be in an RRC connected state, such that the UE may select one of the relays and establishes a PC5 connection with the selected source relay. The UE may then be able to communicate with the base station through the source relay. For example, with reference to the example 400 of FIG. 4, a remote UE 402 may lose its Uu link 408 with the base station 404. Relay 1 406 and Relay 2 406 may be within range of the UE 402, such that the UE 402 may establish a PC5 connection 410 with one of Relay 1 406 or Relay 2 406.

In some instances, the PC5 connection with the source relay (e.g., Relay 1 406) may become weak, and the remote UE 402 may switch to another relay (e.g., Relay 2 406). In such instances, the Relay 1 406 may encounter radio link failure on its Uu link 408 with the base station 404, such that the PC5 link 410 between the Relay 1 406 and the UE 402 is no longer good. The PC5 link 410 between the Relay 1 406 and the UE 402 may degrade or weaken due to the Relay 1 406 being beyond the range of the UE 402.

Figure 5:
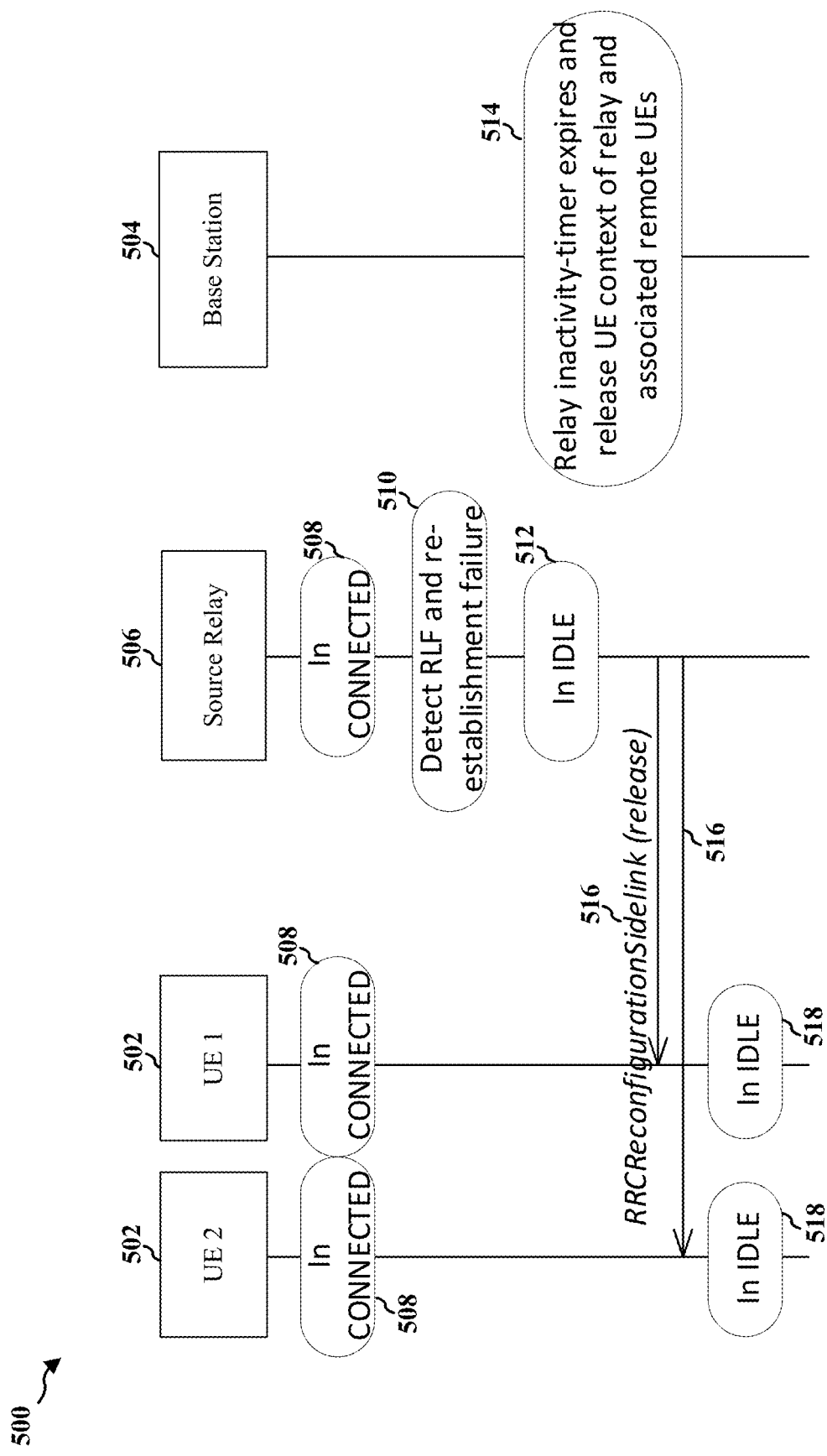
FIG. 5 illustrates an example of radio link failure of a relay device.

FIG. 5 illustrates an example 500 of radio link failure of a relay device. The example 500 includes a UE 1 502, a UE 2 502, a source relay 506, and a base station 504. As shown in the example 500 of FIG. 5, the UE 1 502 and UE 2 502 may be in a connected state (e.g., 508) with the source relay 506. In some instances, the source relay 506 may experience failure on its Uu link with the base station (e.g., 504) while connected with the UE 1 502 and UE 2 502. The source relay 506 may experience failure on its Uu link for a variety of reasons, such as but not limited to, Uu radio link failure, Uu handover failure, or Uu reconfiguration failure. The source relay 506, at 510, may detect the radio link failure and may trigger reestablishment upon the detection the radio link failure. The source relay 506 may enter an idle mode (e.g., 512) after detecting the radio link failure. The base station 504, at 514, may release the UE context of the source relay 506 and associated connected UEs (e.g., UE 1 502 and UE 2 502) upon the expiration of a relay inactivity timer.

The source relay 506 may handle the PC5 links with the UE1 502 and UE 2 502 by releasing or suspending the PC5 link. For example, the source relay 506 may send a sidelink command (e.g., 516) to release or suspend the PC5 link with any active UEs (e.g., UE 1 502 and UE 2 502), such that the active UEs (e.g., UE 1 502 and UE 2 502) enter an idle state (e.g., 518). In addition, the source relay 506 may stop advertising the support of relaying in discovery messages. After a successful Uu link setup, the source relay 506 may resume the suspended PC5 links with the UEs (e.g., UE 1 502 and UE 2 502), and may follow the relay advertisement criteria to resume advertising support for relay service.

When a source relay experiences radio link failure, the connected UE may initiate a relay switching mechanism. For example, the UE may determine a radio link failure with the source relay after the source relay releases the PC5 link with the UE. The UE may search for a new source relay. In some instances, the UE may receive RRC reconfiguration to switch to a new relay. The RRC reconfiguration may be sent to the UE from the source relay. The source relay, in response, may suspend the active PC5 link with the UE and may resume the active PC5 link after the relay successfully recovers its Uu link with the base station. The PC5 link between the source relay and the UE may fail or may not be a reliable connection, such that the UE may initiate the relay switching mechanism. However, the relay switching mechanism may incur a long switching latency.

Aspects presented herein provide a configuration for an improved relay measurement mechanism. The improved relay measurement mechanism may configure a UE with a relay measurement configuration for measuring one or more candidate relays in preparation of switching to a target relay. At least one advantage of the disclosure is that the relay measurement configuration may allow the UE to account for candidate relays that are within a bandwidth for communicating with a source relay as well as for candidate relays that are not within a bandwidth for communicating with the source relay.

In some aspects, a source relay may indicate a configuration of candidate relays to a UE. The configuration of candidate relays may include information related to the candidate relays, such as but not limited to a relay identifier or resource pool for discovery. In some aspects, a base station having a Uu connection with the source relay may determine which relays may serve as candidate relays. The base station may then send the information of the candidate relays to the source relay, such that the source relay sends the information of the candidate relays to the UE. In some aspects, the source relay may be configured to evaluate the relays and determine a list of candidate relays. The source relay may determine the list of candidate relays on its own and without input from the base station.

Figures 6A, 6B:
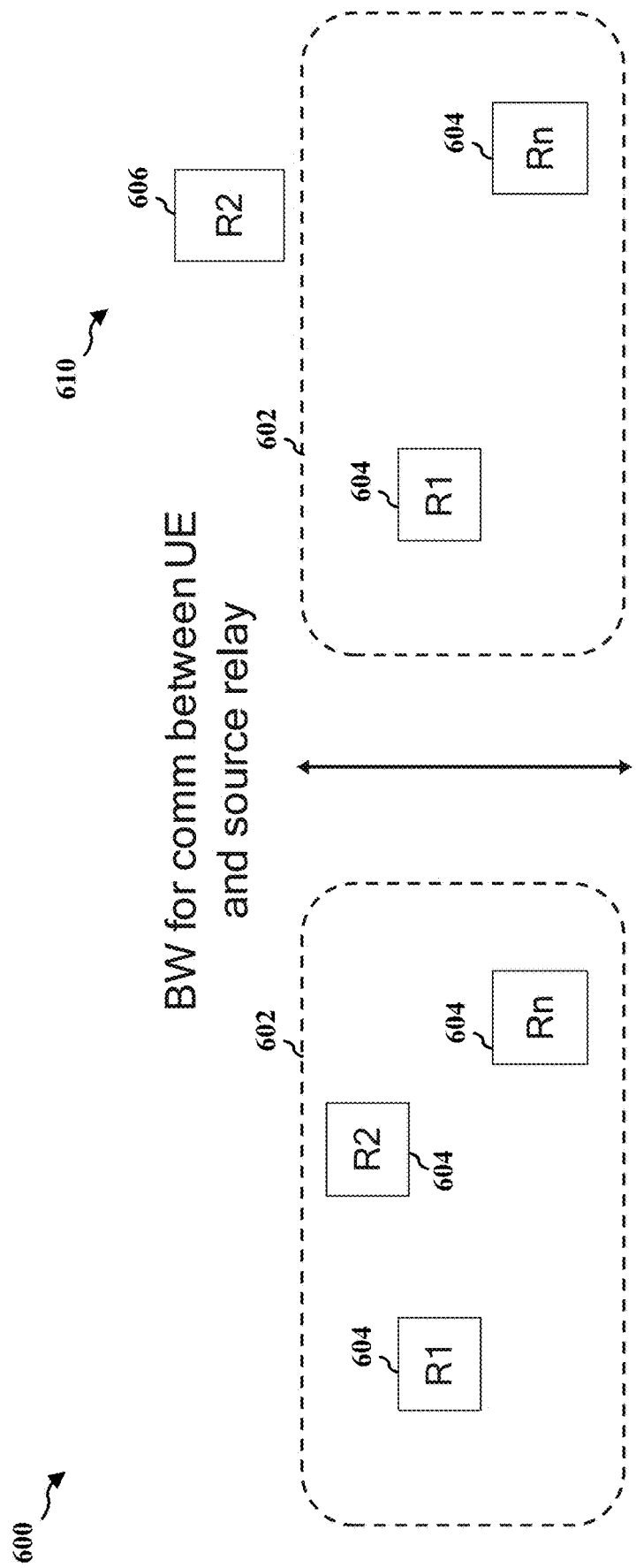
FIGS. 6A-6B illustrate examples of a relay measurement configuration.

The configuration of candidate relays may further include a relay measurement configuration. The relay measurement configuration may comprise an indication of a measurement gap configuration. The indication of the measurement gap configuration may indicate whether candidate relays are within a bandwidth configured for communication between the UE and the source relay. For example, with reference to the example 600 of FIG. 6A, the reference signals R1, R2, . . . Rn (e.g., 604) for the corresponding candidate relays are within the bandwidth 602, which is the bandwidth 602 configured for communication between the UE and the source relay. The reference signals (e.g., R1 604, R2 604, . . . Rn 604) from candidate relays for RSRP measurement are within the bandwidth 602 configured for communication between the UE and the source relay. In the example 600 of FIG. 6A, a measurement gap is not needed if sub-carrier spacings of reference signals are identical. Otherwise, a measurement gap should be provided.

In some instances, the reference signals from some of the candidate relays may not be within an operating bandwidth configured for communication between the UE and the source relay. For example, as shown in the example 610 of FIG. 6B, the reference signal R2 606 is not within the bandwidth 602 configured for communication between the UE and the source relay, while reference signals R1 604 and Rn 604 are within the bandwidth 602. In such instances, a measurement gap should be provided. The measurement gap allows the UE to tune away from the bandwidth to measure the reference signal (e.g., R2 606) of the candidate relay that is outside of the bandwidth 602. In some instances, reference signals from the candidate relays that are outside of the bandwidth (e.g., 602) may comprise a different numerology than the source relay.

In some aspects, a measurement gap may not be defined for intra-cell relay measurements. Measurement resources allocated for the relays may be within the operating bandwidth (e.g., 602) that the UE uses for communicating with the source relay. Measurement of reference signals or channels from the candidate relays may have the same numerology. If the measurement resource is outside of the operating bandwidth (e.g., 602) that the UE uses for communicating with the source relay, then the UE may not measure such measurement resource.

In some aspects, a measurement gap may be configured for intra-cell relay measurements. Measurement resources allocated for a candidate relay may be configured to be outside of the operating bandwidth (e.g., 602) that the UE uses for communicating with the source relay. In some instances, the measurement of reference signals or channels from the candidate relays may have a different numerology. If the measurement of reference signal or channel from the candidate relays have a different numerology, the numerology used to define the measurement gap may be based on the numerology of the physical channel or bandwidth that is associated with the source relay, or the numerology of the reference channel associated with the candidate relay. In some aspects, the measurement gap may be common for reference signals having the same numerology. The measurement gap configuration may be configured as part of a relay indication or part of a PC5 establishment procedure.

The UE may be configured to measure reference signals from the source relay and the list of candidate relays. The UE may be triggered to perform such measurement under certain conditions, such as for example, if the signal measurement of the source relay is below a threshold. The threshold may be preconfigured or may be configured by the source relay or the base station. The UE may measure DMRS of discovery channel form the source relay and the candidate relays. The UE may be configured to rank the candidate relays based on the signal measurements. The UE may establish a PC5 connection with the list of candidate relays when some conditions are met. For example, the RSRP of the source relay maintaining a range of value or meeting a threshold. In some aspects, information related to the list of candidate relays may be indicated to the UE in the configuration of candidate relays. In some aspects, the UE measures each of the candidate relays, such that the UE may select a subset of candidate relays from the list of candidate relays to establish the PC5 connection. The subset of candidate relays may be less than or equal to the list of candidate relays.

The UE may send a measurement report to the source relay. The measurement report may include measurements of the list of candidate relays and measurements of the source relay. In some aspects, the source relay may transmit the measurement report, received from the UE, to the base station. In such aspects, the base station may determine the target relay based on the measurement report. The base station may then transmit, to the source relay, an indication of the target relay from the list of candidate relays. The base station may also send, to the source relay, a relay switch command indicating the UE to switch to the target relay. The source relay, in turn, provides the relay switch command to the UE.

In some aspects, the source relay may be configured to determine the target relay. The source relay may be configured to determine the target relay based on the measurement report received from the UE. The source relay may determine the target relay without input from the base station. The source relay transmits the relay switch command to the UE to indicate the switch to the target relay.

The UE switches to the target relay, in response to receiving the relay switch command from the source relay. The source relay may transmit the relay switch command to the UE in sidelink control information (SCI) or PC5 medium access control (MAC) control element (CE) (MAC-CE). The transmission of the relay switch command using SCI or PC5 MAC-CE comprise Layer-1 or Layer-2 signaling which leads to a significant reduction of time.

In some aspects, the measurement report generated by the UE may comprise a Layer-1 measurement, such as but not limited to a Layer-1 RSRP of a discovery signal of the source relay. In some aspects, the UE may be triggered by an event to perform the measurements of the source relay and list of candidate relays and generate the measurement report. For example, the event triggering the UE to perform the measurement may be based on the certain conditions of the source relay, such as for example, the measurement of RSRP against a threshold. In some aspects, the measurement of the source relay and candidate relays may be configured to be periodic. In some aspects, the measurement of the source relay and candidate relays may be configured to be aperiodic, such that the UE may be triggered by the network to perform the measurements. The source relay may indicate, to the UE, which measurement report type should be utilized by the UE. In some aspects, the measurement report may be carried over physical sidelink control channel (PSCCH) or physical sidelink shared channel (PSSCH).

Figure 7:
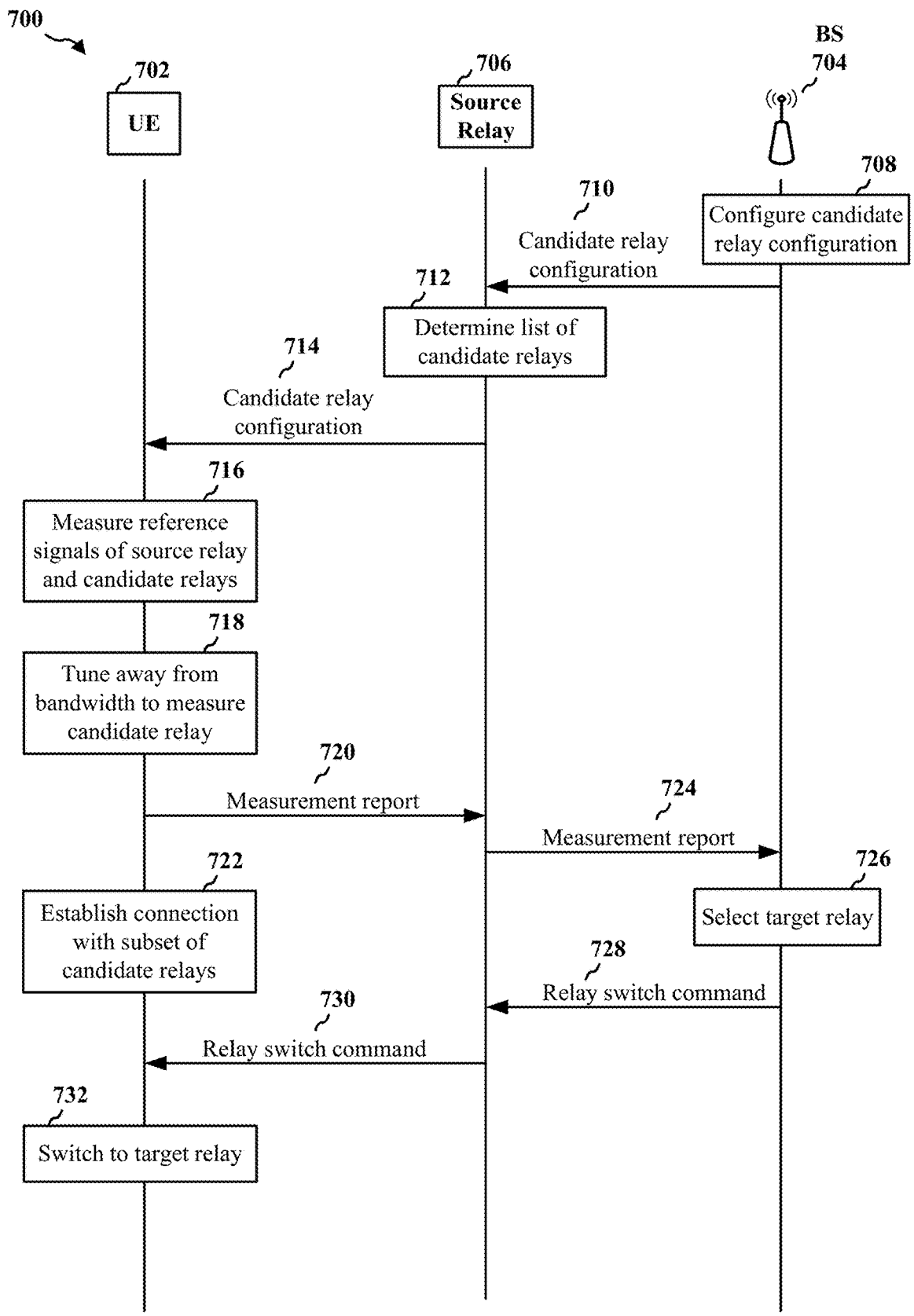
FIG. 7 is a call flow diagram of signaling between a UE, a relay device, and a base station.

FIG. 7 is a call flow diagram 700 of signaling between a UE 702, a base station 704, and a source relay 706. The base station 704 or the source relay 706 may be configured to provide a cell. The UE 702 may be configured to communicate with the base station 704 or the source relay 706. For example, in the context of FIG. 1, the base station 704 or the source relay 706 may correspond to base station 102/180 and, accordingly, the cell may include a geographic coverage area 110 in which communication coverage is provided and/or small cell 102' having a coverage area 110'. Further, a UE 702 or source relay 706 may correspond to at least UE 104. In another example, in the context of FIG. 3, the base station 704 or source relay 706 may correspond to base station 310, and the UE 702 or source relay 706 may correspond to UE 350.

As illustrated at 708, the base station 704 may configure a candidate relay configuration including information of candidate relays (not shown) and a relay measurement configuration. The relay measurement configuration may comprise an indication of a measurement gap configuration. The indication of the measurement gap configuration may indicate whether candidate relays may be within a bandwidth configured for communication between the UE 702 and the source relay 706. In some aspects, the measurement gap configuration may not be provided for reference signals from candidate relays having a same SCS as the source relay 706. The reference signals from the candidate relays may be within an operating bandwidth configured for communication between the UE 702 and the source relay 706. A measurement gap may not be utilized for instances where the SCSs of the reference signals from the candidate relays are the same as the source relay. A measurement gap may be provided and utilized for instances where the SCSs of the reference signals from the candidate relays are different than that of the source relay. The measurement gap may be indicated in the measurement configuration. Measurement resources allocated for the candidate relays may be within the bandwidth configured for communication between the UE 702 and the source relay 706. The reference signals from the candidate relays may have a same numerology as the source relay. In some aspects, the measurement gap configuration may indicate that a measurement gap may be utilized for reference signals from candidate relays that may not be within the bandwidth configured for communication between the UE 702 and the source relay 706. In such aspects, the reference signals from the candidate relays may not be within an operating bandwidth configured for communication between the UE 702 and the source relay 706. Measurement resources allocated for the candidate relays may be configured to be outside of the bandwidth configured for communication between the UE 702 and the source relay 706. In some aspects, reference signals from the candidate relays may comprise a different numerology than the source relay. A numerology used for the measurement gap may be based on a numerology of a physical channel or bandwidth associated with the source relay 706. In some aspects, a numerology used for the measurement gap may be based on a numerology of a reference channel associated with at least one of the candidate relays. The measurement gap may be common for reference signals from candidate relays with the same numerology.

As illustrated at 710, the base station 704 may transmit the candidate relay configuration. The base station 704 may transmit the candidate relay configuration to the source relay 706. The source relay 706 may receive the candidate relay configuration from the base station 704. In some aspects, the base station 704 may determine a list of candidates relays for the candidate relay configuration.

As illustrated at 712, the source relay 706 may determine the list of candidate relays. In some aspects, the source relay 706 may determine the list of candidate relays for the candidate relay configuration.

As illustrated at 714, the source relay 706 may transmit the candidate relay configuration. The source relay may transmit the candidate relay configuration to the UE 702. The UE 702 may receive the candidate relay configuration from the source relay 706. The candidate relay configuration may include information of candidate relays and the relay measurement configuration. In some aspects, a subset of candidate relays may be provided to the UE 702 in the candidate relay configuration. In some aspects, the source relay 706 may comprise a UE. In some aspects, the source relay 706 may comprise a base station.

As illustrated at 716, the UE 702 may measure a reference signal of the source relay 706 and each of the candidate relays based on the candidate relay configuration. In some aspects, measuring the reference signal may comprise measuring a demodulated reference signal (DMRS) of a discovery channel from the source relay 706 and each of the candidate relays.

As illustrated at 718, the UE 702 may tune away from the bandwidth configured for communication between the UE 702 and the source relay 706. The UE 702 tune away from the bandwidth configured for communication between the UE 702 and source relay 706 to measure a reference signal from at least one candidate relay that is not within the bandwidth configured for communication between the UE 702 and the source relay 706.

As illustrated at 720, the UE 702 may transmit a measurement report. The UE 702 may transmit the measurement report to the source relay 706. The source relay 706 may receive the measurement report from the UE 702. The measurement report may comprise measurements of the reference signal of the subset of candidate relays. In some aspects, the measurement report may comprise a measurement of a layer 1 reference signal receive power (RSRP) of the source relay 706 and the subset of candidate relays. The measurement report may be carried over physical sidelink control channel (PSCCH) or physical sidelink shared channel (PSSCH).

As illustrated at 722, the UE 702 may establish a connection with a subset of candidate relays. In some aspects, the connection with the subset of candidate relays may comprise a PC5 connection. The UE 702 may establish the connection with the subset of candidate relays in preparation of switching to a target relay from the subset of candidate relays.

As illustrated at 724, the source relay 706 may transmit the measurement report to the base station 704. The source relay 706 may transmit, to the base station 704, the measurement report received from the UE 702. The base station 704 may receive the measurement report from the source relay 706.

As illustrated at 726, the base station 704 may select a target relay. The base station 704 may select the target relay from the subset of candidate relays. The base station 704 may select the target relay from the subset of candidate relays based on the measurement report.

In some aspects, the source relay 706 may receive an indication of a target relay. The source relay 706 may receive the indication of the target relay from the base station 704. The indication may indicate the target relay from the subset of candidate relays. In some aspects, the base station 704 may determine the target relay from the subset of candidate relays based on the measurement report.

As illustrated at 728, the base station 704 may transmit the relay switch command. The base station 704 may transmit the relay switch command to the source relay 706. The source relay 706 may receive the relay switch command from the base station 704. The relay switch command may be for the UE 702 to switch to the target relay. In some aspects, the relay switch command may be transmitted via Layer-1 or Layer-2 signaling. The Layer-1 signaling may comprise control information or sidelink control information. The Layer-2 signaling may comprise MAC-CE. In some aspects, the target relay information may be indicated in the relay switch command.

As illustrated at 730, the source relay 706 may transmit the relay switch command. The source relay 706 may transmit the relay switch command to the UE 702. The UE 702 may receive the relay switch command from the source relay 706. The relay switch command may indicate the UE 702 to switch to a target relay from the subset of candidate relays. In some aspects, the target relay information may be indicated in the relay switch command. In some aspects, the source relay 706 may determine the target relay based on the measurement report. In some aspects, the relay switch command may be received via Layer-1 or Layer-2 signaling. The Layer-1 signaling may comprise control information or sidelink control information. The Layer-2 signaling may comprise medium access control (MAC) control element (CE) (MAC-CE). In some aspects, the target relay information may be indicated in the relay switch command. In some aspects, the base station 704 may determine the target relay from the subset of candidate relays based on the measurement report. In some aspects, the source relay 706 may determine the target relay based on the measurement report.

As illustrated at 732, the UE 702 may switch to the target relay. The UE 702 may switch to the target relay as indicted in the relay switch command.

Figure 8:
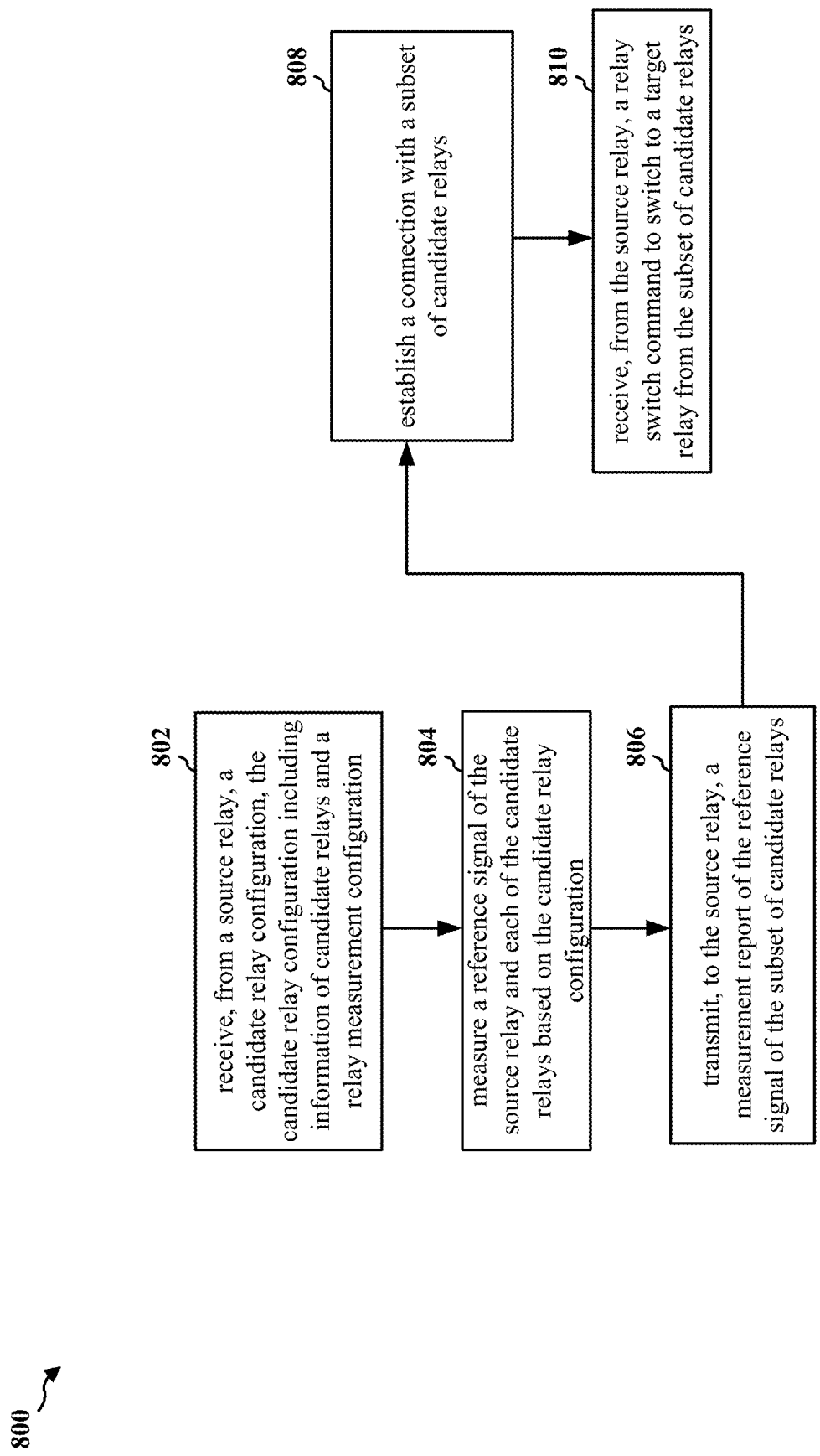
FIG. 8 is a flowchart of a method of wireless communication.

FIG. 8 is a flowchart 800 of a method of wireless communication. The method may be performed by a UE or a component of a UE (e.g., the UE 104; the apparatus _1002; the cellular baseband processor _1004, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may configure the UE with a relay measurement configuration for measuring one or more candidate relays in preparation of switching to a target relay.

At 802, the UE may receive a candidate relay configuration. For example, 802 may be performed by candidate relay component 1040 of apparatus 1002. The UE may receive the candidate relay configuration from a source relay. The candidate relay configuration may include information of candidate relays and a relay measurement configuration. In some aspects, the relay measurement configuration may comprise an indication of a measurement gap configuration. The indication of the measurement gap configuration may indicate whether candidate relays are within a bandwidth configured for communication between the UE and the source relay. In some aspects, the measurement gap configuration may not be provided for reference signals from candidate relays having a same sub-carrier spacing (SCS) as the source relay. In such aspects, the reference signals from the candidate relays may be within an operating bandwidth configured for communication between the UE and the source relay. A measurement gap may not be utilized for instances where the SCSs of the reference signals from the candidate relays are the same as the source relay. A measurement gap may be provided and utilized for instances where the SCSs of the reference signals from the candidate relays are different than that of the source relay. The measurement gap may be indicated in the measurement configuration. Measurement resources allocated for the candidate relays may be within the bandwidth configured for communication between the UE and the source relay. The reference signals from the candidate relays may have a same numerology as the source relay. In some aspects, the measurement gap configuration may indicate that a measurement gap may be utilized for reference signals from candidate relays that are not within the bandwidth configured for communication between the UE and the source relay. In such aspects, the reference signals from the candidate relays may not be within an operating bandwidth configured for communication between the UE and the source relay. Measurement resources allocated for the candidate relays may be configured to be outside of the bandwidth configured for communication between the UE and the source relay. In some aspects, the reference signals from the candidate relays may comprise a different numerology than the source relay. A numerology used for the measurement gap may be based on a numerology of a physical channel or bandwidth associated with the source relay. In some aspects, a numerology used for the measurement gap may be based on a numerology of a reference channel associated with the candidate relay. The measurement gap may be common for reference signals from candidate relays with a same numerology.

At 804, the UE may measure a reference signal of the source relay and each of the candidate relays based on the candidate relay configuration. For example, 804 may be performed by measure component 1042 of apparatus 1002. In some aspects, measuring the reference signal may comprise measuring a demodulated reference signal (DMRS) of a discovery channel from the source relay and each of the candidate relays.

At 806, the UE may transmit a measurement report. For example, 806 may be performed by report component 1046 of apparatus 1002. The UE may transmit the measurement report to the source relay. The measurement report may comprise measurements of the reference signal of the subset of candidate relays. In some aspects, the measurement report may comprise a measurement of a layer 1 reference signal receive power (RSRP) of the source relay and the subset of candidate relays. The measurement report may be carried over physical sidelink control channel (PSCCH) or physical sidelink shared channel (PSSCH).

At 808, the UE may establish a connection with a subset of candidate relays. For example, 808 may be performed by connection component 1048 of apparatus 1002. In some aspects, the connection with the subset of candidate relays may comprise a PC5 connection.

At 810, the UE may receive a relay switch command. For example, 810 may be performed by switch component 1050 of apparatus 1002. The UE may receive the relay switch command from the source relay. The relay switch command may indicate to the UE to switch to a target relay from the subset of candidate relays. In some aspects, the relay switch command may be received via Layer-1 or Layer-2 signaling. The Layer-1 signaling may comprise control information or sidelink control information. The Layer-2 signaling may comprise medium access control (MAC) control element (CE) (MAC-CE). In some aspects, the target relay information may be indicated in the relay switch command. In some aspects, the base station may determine the target relay from the subset of candidate relays based on the measurement report. In some aspects, the source relay may determine the target relay based on the measurement report.

Figure 9:
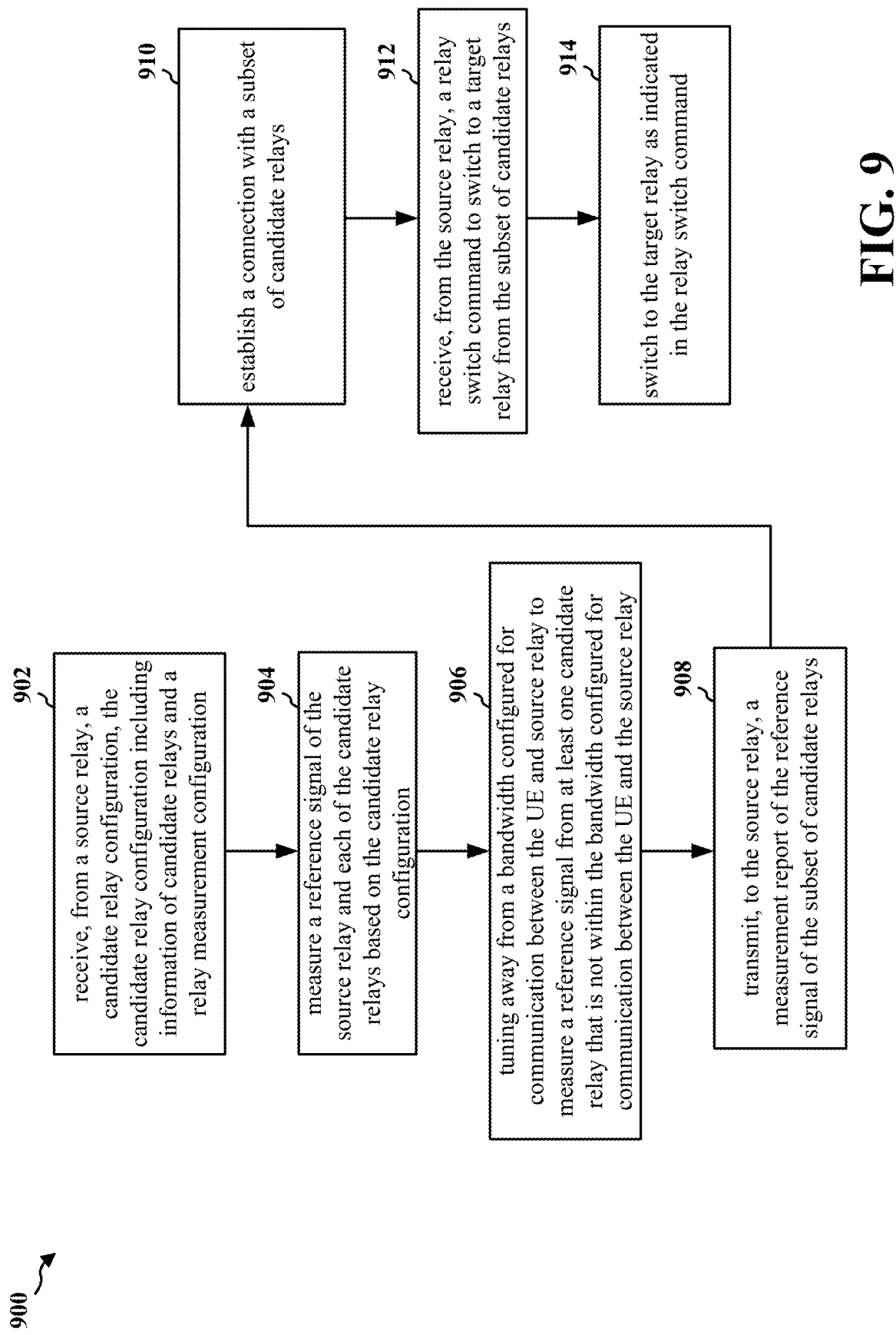
FIG. 9 is a flowchart of a method of wireless communication.

FIG. 9 is a flowchart 900 of a method of wireless communication. The method may be performed by a UE or a component of a UE (e.g., the UE 104; the apparatus 1002; the cellular baseband processor 1004, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may configure the UE with a relay measurement configuration for measuring one or more candidate relays in preparation of switching to a target relay.

At 902, the UE may receive a candidate relay configuration. For example, 902 may be performed by candidate relay component 1040 of apparatus 1002. The UE may receive the candidate relay configuration from a source relay. The candidate relay configuration may include information of candidate relays and a relay measurement configuration. In some aspects, the relay measurement configuration may comprise an indication of a measurement gap configuration. The indication of the measurement gap configuration may indicate whether candidate relays are within a bandwidth configured for communication between the UE and the source relay. In some aspects, the measurement gap configuration may not be provided for reference signals from candidate relays having a same sub-carrier spacing (SCS) as the source relay. In such aspects, the reference signals from the candidate relays may be within an operating bandwidth configured for communication between the UE and the source relay. A measurement gap may not be utilized for instances where the SCSs of the reference signals from the candidate relays are the same as the source relay. A measurement gap may be provided and utilized for instances where the SCSs of the reference signals from the candidate relays are different than that of the source relay. The measurement gap may be indicated in the measurement configuration. Measurement resources allocated for the candidate relays may be within the bandwidth configured for communication between the UE and the source relay. The reference signals from the candidate relays may have a same numerology as the source relay. In some aspects, the measurement gap configuration may indicate that a measurement gap may be utilized for reference signals from candidate relays that are not within the bandwidth configured for communication between the UE and the source relay. In such aspects, the reference signals from the candidate relays may not be within an operating bandwidth configured for communication between the UE and the source relay. Measurement resources allocated for the candidate relays may be configured to be outside of the bandwidth configured for communication between the UE and the source relay. In some aspects, the reference signals from the candidate relays may comprise a different numerology than the source relay. A numerology used for the measurement gap may be based on a numerology of a physical channel or bandwidth associated with the source relay. In some aspects, a numerology used for the measurement gap may be based on a numerology of a reference channel associated with the candidate relay. The measurement gap may be common for reference signals from candidate relays with a same numerology.

At 904, the UE may measure a reference signal of the source relay and each of the candidate relays based on the candidate relay configuration. For example, 904 may be performed by measure component 1042 of apparatus 1002. In some aspects, measuring the reference signal may comprise measuring a DMRS of a discovery channel from the source relay and each of the candidate relays.

At 906, the UE may tune away from the bandwidth configured for communication between the UE and source relay. For example, 906 may be performed by tune component 1044 of apparatus 1002. The UE tune away from the bandwidth configured for communication between the UE and source relay to measure a reference signal from at least one candidate relay that is not within the bandwidth configured for communication between the UE and the source relay.

At 908, the UE may transmit a measurement report. For example, 908 may be performed by report component 1046 of apparatus 1002. The UE may transmit the measurement report to the source relay. The measurement report may comprise measurements of the reference signal of the subset of candidate relays. In some aspects, the measurement report may comprise a measurement of a layer 1 RSRP of the source relay and the subset of candidate relays. The measurement report may be carried over PSCCH or PSSCH.

At 910, the UE may establish a connection with a subset of candidate relays. For example, 910 may be performed by connection component 1048 of apparatus 1002. In some aspects, the connection with the subset of candidate relays may comprise a PC5 connection.

At 912, the UE may receive a relay switch command. For example, 912 may be performed by switch component 1050 of apparatus 1002. The UE may receive the relay switch command from the source relay. The relay switch command may indicate to the UE to switch to a target relay from the subset of candidate relays. In some aspects, the relay switch command may be received via Layer-1 or Layer-2 signaling. The Layer-1 signaling may comprise control information or sidelink control information. The Layer-2 signaling may comprise MAC-CE. In some aspects, the target relay information may be indicated in the relay switch command. In some aspects, the base station may determine the target relay from the subset of candidate relays based on the measurement report. In some aspects, the source relay may determine the target relay based on the measurement report.

At 914, the UE may switch to the target relay. For example, 914 may be performed by target relay component 1052 of apparatus 1002. The UE may switch to the target relay as indicted in the relay switch command.

Figure 10:
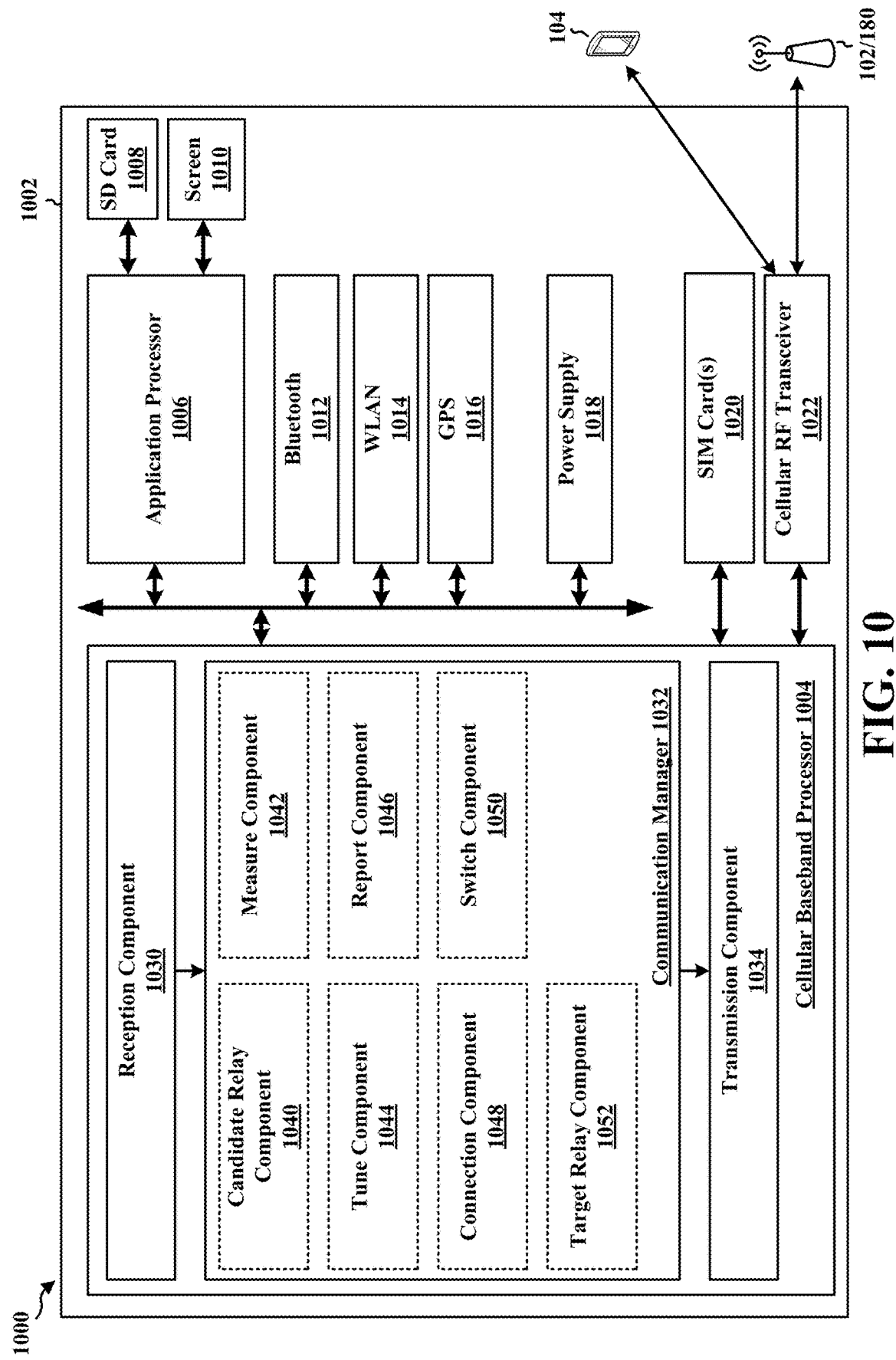
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes a candidate relay component 1040 that is configured to receive a candidate relay configuration, e.g., as described in connection with 802 of FIG. 8 or 902 of FIG. 9. The communication manager 1032 further includes a measure component 1042 that is configured to measure a reference signal of the source relay and each of the candidate relays based on the candidate relay configuration, e.g., as described in connection with 804 of FIG. 8 or 904 of FIG. 9. The communication manager 1032 further includes a tune component 1044 that is configured to tune away from the bandwidth configured for communication between the UE and source relay, e.g., as described in connection with 906 of FIG. 9. The communication manager 1032 further includes a report component 1046 that is configured to transmit a measurement report, e.g., as described in connection with 806 of FIG. 8 or 908 of FIG. 9. The communication manager 1032 further includes a connection component 1048 that is configured to establish a connection with a subset of candidate relays, e.g., as described in connection with 808 of FIG. 8 or 910 of FIG. 9. The communication manager 1032 further includes a switch component 1050 that is configured to receive a relay switch command, e.g., as described in connection with 810 of FIG. 8 or 912 of FIG. 9. The communication manager 1032 further includes a target relay component 1052 that is configured to switch to the target relay, e.g., as described in connection with 914 of FIG. 9.

The apparatus may include additional components that perform each of the blocks of the algorithm in the flowcharts of FIGS. 8 and 9. As such, each block in the flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, includes means for receiving, from a source relay, a candidate relay configuration. The candidate relay configuration including information of candidate relays and a relay measurement configuration. The apparatus includes means for measuring a reference signal of the source relay and each of the candidate relays based on the candidate relay configuration. The apparatus includes means for transmitting, to the source relay, a measurement report of the reference signal of the subset of candidate relays. The apparatus includes means for establishing a connection with a subset of candidate relays. The apparatus includes means for receiving, from the source relay, a relay switch command to switch to a target relay from the subset of candidate relays. The apparatus further includes means for tuning away from the bandwidth configured for communication between the UE and source relay to measure a reference signal from at least one candidate relay that is not within the bandwidth configured for communication between the UE and the source relay. The apparatus further includes means for switching to the target relay as indicated in the relay switch command. The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
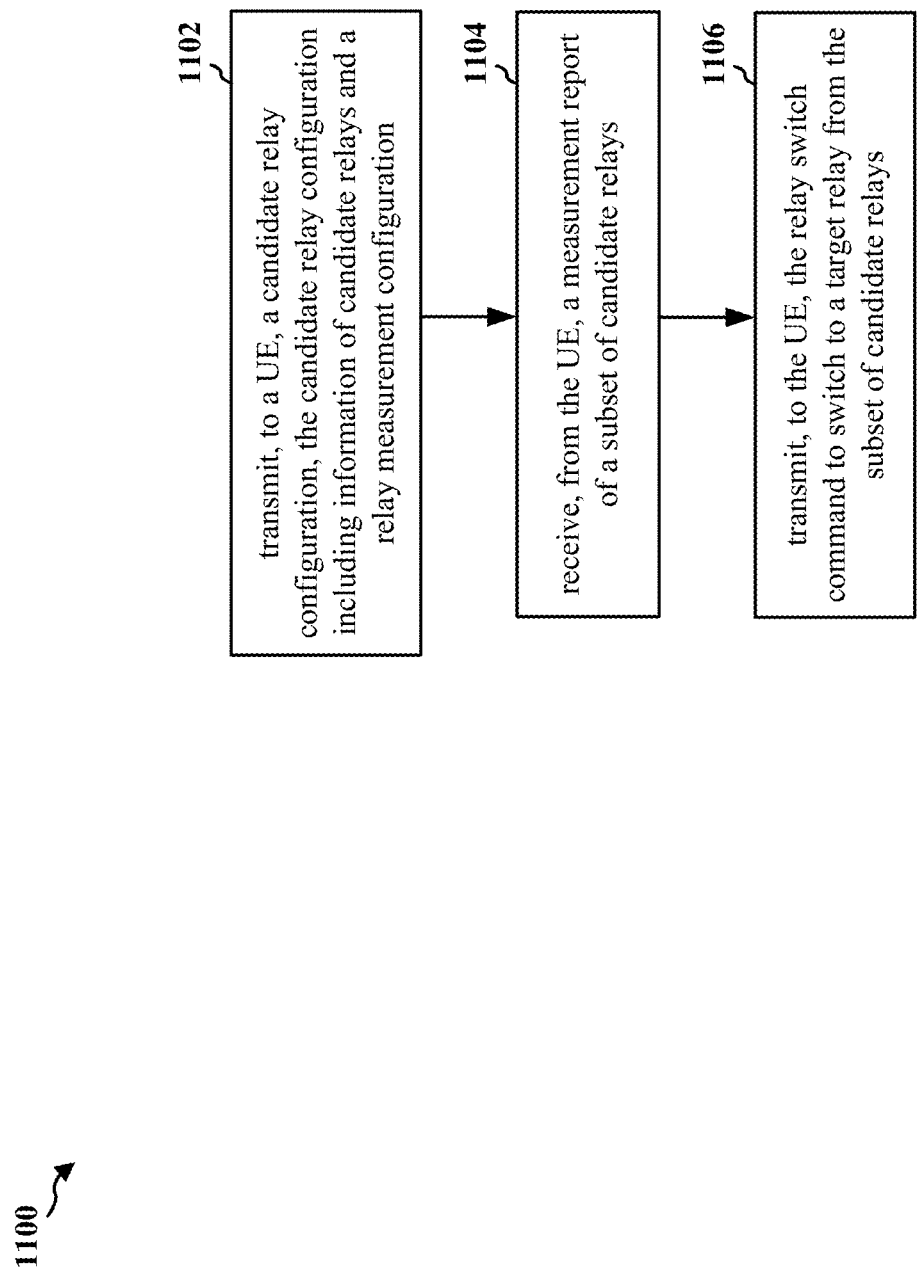
FIG. 11 is a flowchart of a method of wireless communication.

FIG. 11 is a flowchart 1100 of a method of wireless communication. The method may be performed by a UE or a component of a UE (e.g., the UE 104, 402, 502, 702; source relay 406, 506, 706; the apparatus 1302; the baseband unit 1304, which may include the memory 376 and which may be the entire base station 310 or a component of the base station 310, such as the TX processor 316, the RX processor 370, and/or the controller/processor 375). The method may also be performed by a base station or a component of a base station (e.g., the base station 102/180, 404, 504, 704; source relay 406, 506, 706; the apparatus 1302; the baseband unit 1304, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a source relay to configure a UE with a relay measurement configuration for measuring one or more candidate relays in preparation of switching to a target relay.

At 1102, the source relay may transmit the candidate relay configuration. For example, 1102 may be performed by configuration component 1344 of apparatus 1302. The source relay may transmit the candidate relay configuration to a UE. The candidate relay configuration may include information of candidate relays and a relay measurement configuration. The relay measurement configuration may comprise an indication of a measurement gap configuration. In some aspects, the indication of the measurement gap configuration may indicate whether candidate relays may be within a bandwidth configured for communication between the UE and the source relay. In such aspects, the measurement gap configuration may indicate that a measurement gap may not be utilized for reference signals from candidate relays having a same SCS as the source relay. The reference signals from the candidate relays may be within an operating bandwidth configured for communication between the UE and the source relay. Measurement resources allocated for the candidate relays may be within the bandwidth configured for communication between the UE and the source relay. In some aspects, the reference signals from the candidate relays may have a same numerology as the source relay. In some aspects, the measurement gap configuration may indicate that a measurement gap may be utilized for reference signals from candidate relays that may not be within the bandwidth configured for communication between the UE and the source relay. The reference signals from the candidate relays may not be within an operating bandwidth configured for communication between the UE and the source relay. Measurement resources allocated for the candidate relays may be configured to be outside of the bandwidth configured for communication between the UE and the source relay. Reference signals from the candidate relays may comprise a different numerology than the source relay. In some aspects, a numerology used for the measurement gap may be based on a numerology of a physical channel or bandwidth associated with the source relay. In some aspects, a numerology used for the measurement gap may be based on a numerology of a reference channel associated with the candidate relay. The measurement gap may be common for reference signals from candidate relays with a same numerology. In some aspects, a subset of candidate relays may be provided to the UE in the candidate relay configuration. In some aspects, the source relay may comprise a UE. In some aspects, the source relay may comprise a base station.

At 1104, the source relay may receive a measurement report. For example, 1104 may be performed by report component 1346 of apparatus 1302. The source relay may receive the measurement report from the UE. The measurement report may comprise measurements of a subset of candidate relays. In some aspects, the measurement report may comprise a measurement of a Layer-1 RSRP of the source relay and the subset of candidate relays. In some aspects, the measurement report is carried over PSCCH or PSSCH.

At 1106, the source relay may transmit the relay switch command. For example, 1106 may be performed by switch component 1350 of apparatus 1302. The source relay may transmit the relay switch command to the UE. The relay switch command may indicate the UE to switch to a target relay from the subset of candidate relays. In some aspects, the target relay information may be indicated in the relay switch command. In some aspects, the source relay may determine the target relay based on the measurement report.

Figure 12:
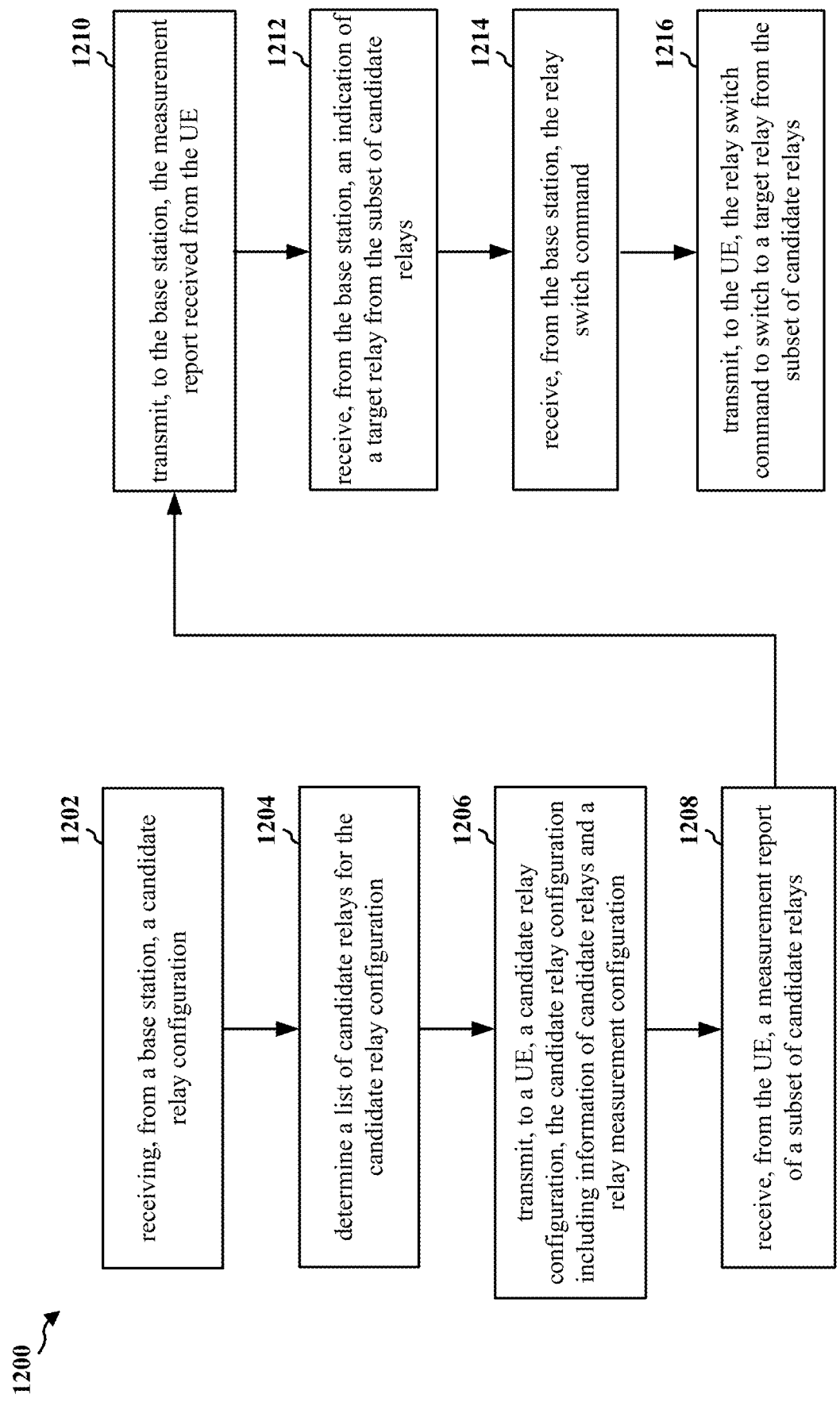
FIG. 12 is a flowchart of a method of wireless communication.
Figure 13:
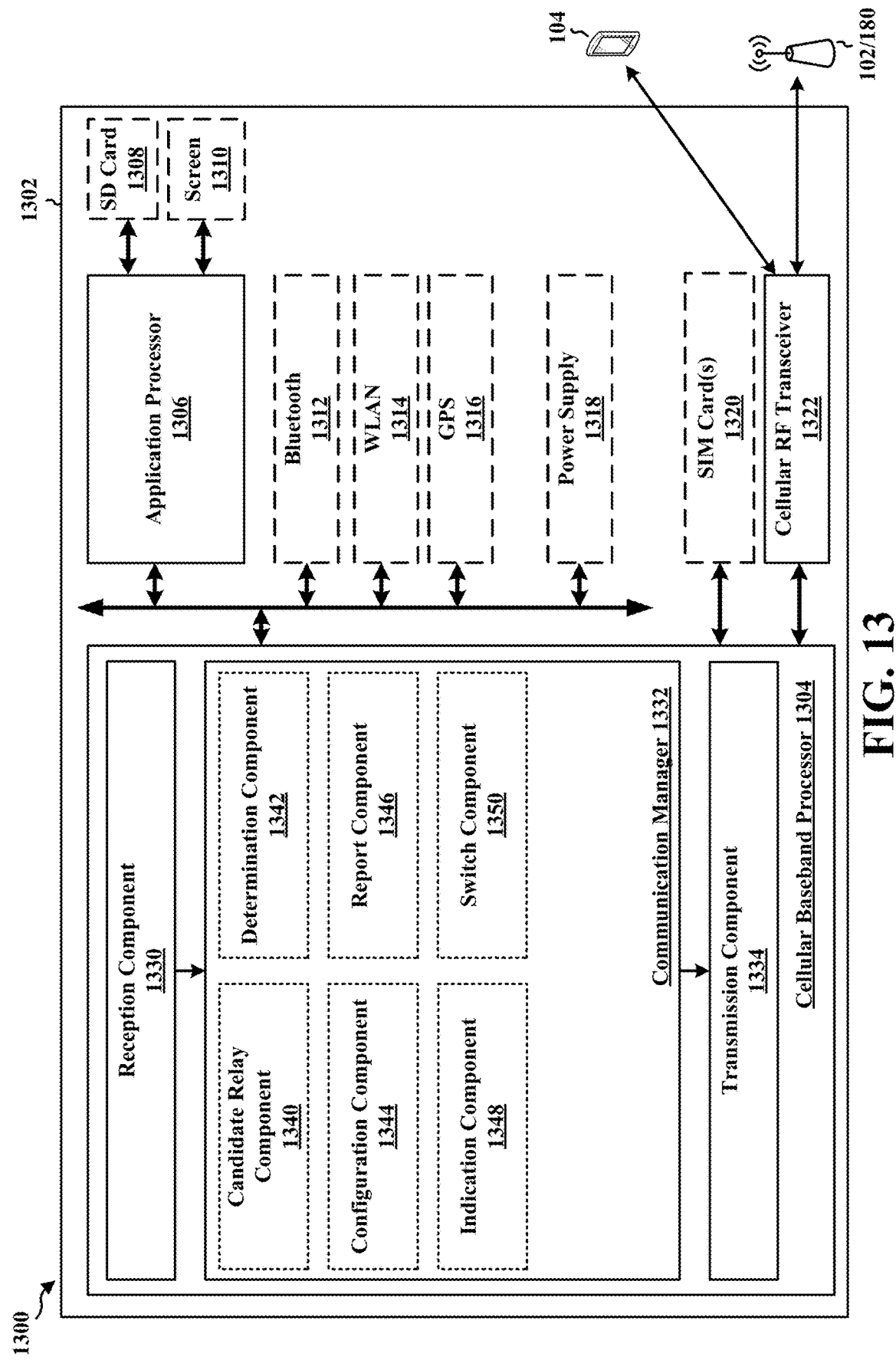
FIG. 13 is a diagram illustrating an example of a hardware implementation for an example apparatus.

FIG. 12 is a flowchart 1200 of a method of wireless communication. The method may be performed by a UE or a component of a UE (e.g., the UE 104, 402, 502, 702; source relay 406, 506, 706; the apparatus 1302; the baseband unit 1304, which may include the memory 376 and which may be the entire base station 310 or a component of the base station 310, such as the TX processor 316, the RX processor 370, and/or the controller/processor 375). The method may also be performed by a base station or a component of a base station (e.g., the base station 102/180, 404, 504, 704; source relay 406, 506, 706; the apparatus 1302; the baseband unit 1304, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a source relay to configure a UE with a relay measurement configuration for measuring one or more candidate relays in preparation of switching to a target relay.

At 1202, the source relay may receive a candidate relay configuration. For example, 1202 may be performed by candidate relay component 1340 of apparatus 1302. The source relay may receive the candidate relay configuration from a base station. In some aspects, the base station may determine a list of candidates relays for the candidate relay configuration.

At 1204, the source relay may determine a list of candidate relays. For example, 1204 may be performed by determination component 1342 of apparatus 1302. The source relay may determine the list of candidate relays for the candidate relay configuration.

At 1206, the source relay may transmit the candidate relay configuration. For example, 1206 may be performed by configuration component 1344 of apparatus 1302. The source relay may transmit the candidate relay configuration to a UE. The candidate relay configuration may include information of candidate relays and a relay measurement configuration. The relay measurement configuration may comprise an indication of a measurement gap configuration. In some aspects, the indication of the measurement gap configuration may indicate whether candidate relays may be within a bandwidth configured for communication between the UE and the source relay. In such aspects, the measurement gap configuration may indicate that a measurement gap may not be utilized for reference signals from candidate relays having a same SCS as the source relay. The reference signals from the candidate relays may be within an operating bandwidth configured for communication between the UE and the source relay. Measurement resources allocated for the candidate relays may be within the bandwidth configured for communication between the UE and the source relay. In some aspects, the reference signals from the candidate relays may have a same numerology as the source relay. In some aspects, the measurement gap configuration may indicate that a measurement gap may be utilized for reference signals from candidate relays that may not be within the bandwidth configured for communication between the UE and the source relay. The reference signals from the candidate relays may not be within an operating bandwidth configured for communication between the UE and the source relay. Measurement resources allocated for the candidate relays may be configured to be outside of the bandwidth configured for communication between the UE and the source relay. Reference signals from the candidate relays may comprise a different numerology than the source relay. In some aspects, a numerology used for the measurement gap may be based on a numerology of a physical channel or bandwidth associated with the source relay. In some aspects, a numerology used for the measurement gap may be based on a numerology of a reference channel associated with the candidate relay. The measurement gap may be common for reference signals from candidate relays with a same numerology. In some aspects, a subset of candidate relays may be provided to the UE in the candidate relay configuration. In some aspects, the source relay may comprise a UE. In some aspects, the source relay may comprise a base station.

At 1208, the source relay may receive a measurement report. For example, 1208 may be performed by report component 1346 of apparatus 1302. The source relay may receive the measurement report from the UE. The measurement report may comprise measurements of a subset of candidate relays. In some aspects, the measurement report may comprise a measurement of a Layer-1 RSRP of the source relay and the subset of candidate relays. In some aspects, the measurement report is carried over PSCCH or PSSCH.

At 1210, the source relay may transmit the measurement report to a base station. For example, 1210 may be performed by report component 1346 of apparatus 1302. The source relay may transmit, to the base station, the measurement report received from the UE.

At 1212, the source relay may receive an indication of a target relay. For example, 1212 may be performed by indication component 1348 of apparatus 1302. The source relay may receive the indication of the target relay from the base station. The indication may indicate the target relay from the subset of candidate relays. In some aspects, the base station may determine the target relay from the subset of candidate relays based on the measurement report.

At 1214, the source relay may receive the relay switch command. For example, 1214 may be performed by switch component 1350 of apparatus 1302. The source relay may receive the relay switch command from the base station. In some aspects, the relay switch command may be transmitted to the UE via Layer-1 or Layer-2 signaling. The Layer-1 signaling may comprise control information or sidelink control information. The Layer-2 signaling may comprise MAC-CE.

At 1216, the source relay may transmit the relay switch command. For example, 1216 may be performed by switch component 1350 of apparatus 1302. The source relay may transmit the relay switch command to the UE. The relay switch command may indicate the UE to switch to a target relay from the subset of candidate relays. In some aspects, the target relay information may be indicated in the relay switch command. In some aspects, the source relay may determine the target relay based on the measurement report.

At 1202, the source relay may receive a candidate relay configuration. For example, 1202 may be performed by candidate relay component 1340 of apparatus 1302. The source relay may receive the candidate relay configuration from a base station. In some aspects, the base station may determine a list of candidates relays for the candidate relay configuration.

At 1204, the source relay may determine a list of candidate relays. For example, 1204 may be performed by determination component 1342 of apparatus 1302. The source relay may determine the list of candidate relays for the candidate relay configuration.

At 1206, the source relay may transmit the candidate relay configuration. For example, 1206 may be performed by configuration component 1344 of apparatus 1302. The source relay may transmit the candidate relay configuration to a UE. The candidate relay configuration may include information of candidate relays and a relay measurement configuration. The relay measurement configuration may comprise an indication of a measurement gap configuration. In some aspects, the indication of the measurement gap configuration may indicate whether candidate relays may be within a bandwidth configured for communication between the UE and the source relay. In such aspects, the measurement gap configuration may indicate that a measurement gap may not be utilized for reference signals from candidate relays having a same SCS as the source relay. The reference signals from the candidate relays may be within an operating bandwidth configured for communication between the UE and the source relay. Measurement resources allocated for the candidate relays may be within the bandwidth configured for communication between the UE and the source relay. In some aspects, the reference signals from the candidate relays may have a same numerology as the source relay. In some aspects, the measurement gap configuration may indicate that a measurement gap may be utilized for reference signals from candidate relays that may not be within the bandwidth configured for communication between the UE and the source relay. The reference signals from the candidate relays may not be within an operating bandwidth configured for communication between the UE and the source relay. Measurement resources allocated for the candidate relays may be configured to be outside of the bandwidth configured for communication between the UE and the source relay. Reference signals from the candidate relays may comprise a different numerology than the source relay. In some aspects, a numerology used for the measurement gap may be based on a numerology of a physical channel or bandwidth associated with the source relay. In some aspects, a numerology used for the measurement gap may be based on a numerology of a reference channel associated with the candidate relay. The measurement gap may be common for reference signals from candidate relays with a same numerology. In some aspects, a subset of candidate relays may be provided to the UE in the candidate relay configuration. In some aspects, the source relay may comprise a UE. In some aspects, the source relay may comprise a base station.

At 1208, the source relay may receive a measurement report. For example, 1208 may be performed by report component 1346 of apparatus 1302. The source relay may receive the measurement report from the UE. The measurement report may comprise measurements of a subset of candidate relays. In some aspects, the measurement report may comprise a measurement of a Layer-1 RSRP of the source relay and the subset of candidate relays. In some aspects, the measurement report is carried over PSCCH or PSSCH.

At 1210, the source relay may transmit the measurement report to a base station. For example, 1210 may be performed by report component 1346 of apparatus 1302. The source relay may transmit, to the base station, the measurement report received from the UE.

At 1212, the source relay may receive an indication of a target relay. For example, 1212 may be performed by indication component 1348 of apparatus 1302. The source relay may receive the indication of the target relay from the base station. The indication may indicate the target relay from the subset of candidate relays. In some aspects, the base station may determine the target relay from the subset of candidate relays based on the measurement report.

At 1214, the source relay may receive the relay switch command. For example, 1214 may be performed by switch component 1350 of apparatus 1302. The source relay may receive the relay switch command from the base station. In some aspects, the relay switch command may be transmitted to the UE via Layer-1 or Layer-2 signaling. The Layer-1 signaling may comprise control information or sidelink control information. The Layer-2 signaling may comprise MAC-CE.

At 1216, the source relay may transmit the relay switch command. For example, 1216 may be performed by switch component 1350 of apparatus 1302. The source relay may transmit the relay switch command to the UE. The relay switch command may indicate the UE to switch to a target relay from the subset of candidate relays. In some aspects, the target relay information may be indicated in the relay switch command. In some aspects, the source relay may determine the target relay based on the measurement report.

The communication manager 1332 includes a candidate relay component 1340 that is configured to receive a candidate relay configuration, e.g., as described in connection with 1202 of FIG. 12. The communication manager 1332 further includes a determination component 1342 that is configured to determine a list of candidate relays, e.g., as described in connection with 1204 of FIG. 12. The communication manager 1332 further includes a configuration component 1344 that is configured to transmit the candidate relay configuration, e.g., as described in connection with 1102 of FIG. 11 or 1206 of FIG. 12. The communication manager 1332 further includes a report component 1346 that is configured to receive a measurement report, e.g., as described in connection with 1104 of FIG. 11 or 1208 of FIG. 12. The report component 1346 may be configured to transmit the measurement report to a base station, e.g., as described in connection with 1210 of FIG. 12. The communication manager 1332 further includes an indication component 1348 that is configured to receive an indication of a target relay, e.g., as described in 1212 of FIG. 12. The communication manager 1332 further includes a switch component 1350 that is configured to receive the relay switch command, e.g., as described in connection with 1214 of FIG. 12. The switch component 1350 may be configured to transmit the relay switch command, e.g., as described in connection with 1106 of FIG. 11 or 1216 of FIG. 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for transmitting, to a UE, a candidate relay configuration. The candidate relay configuration including information of candidate relays and a relay measurement configuration. The apparatus includes means for receiving, from the UE, a measurement report of a subset of candidate relays. The apparatus includes means for transmitting, to the UE, a relay switch command to switch to a target relay from the subset of candidate relays. The apparatus further includes means for receiving, from the base station, the candidate relay configuration. The apparatus further includes means for determining a list of candidate relays for the candidate relay configuration. The apparatus further includes means for receiving, from a base station, the relay switch command. The apparatus further includes means for transmitting, to a base station, the measurement report received from the UE. The apparatus further includes means for receiving, from the base station, an indication of a target relay from the subset of candidate relays. The means may be one or more of the components of the apparatus 1302 configured to perform the functions recited by the means. As described supra, the apparatus 1302 may include the TX Processor 316, the RX Processor 370, and the controller/ processor 375. As such, in one configuration, the means may be the TX Processor 316, the RX Processor 370, and the controller/processor 375 configured to perform the functions recited by the means.

Figure 14:
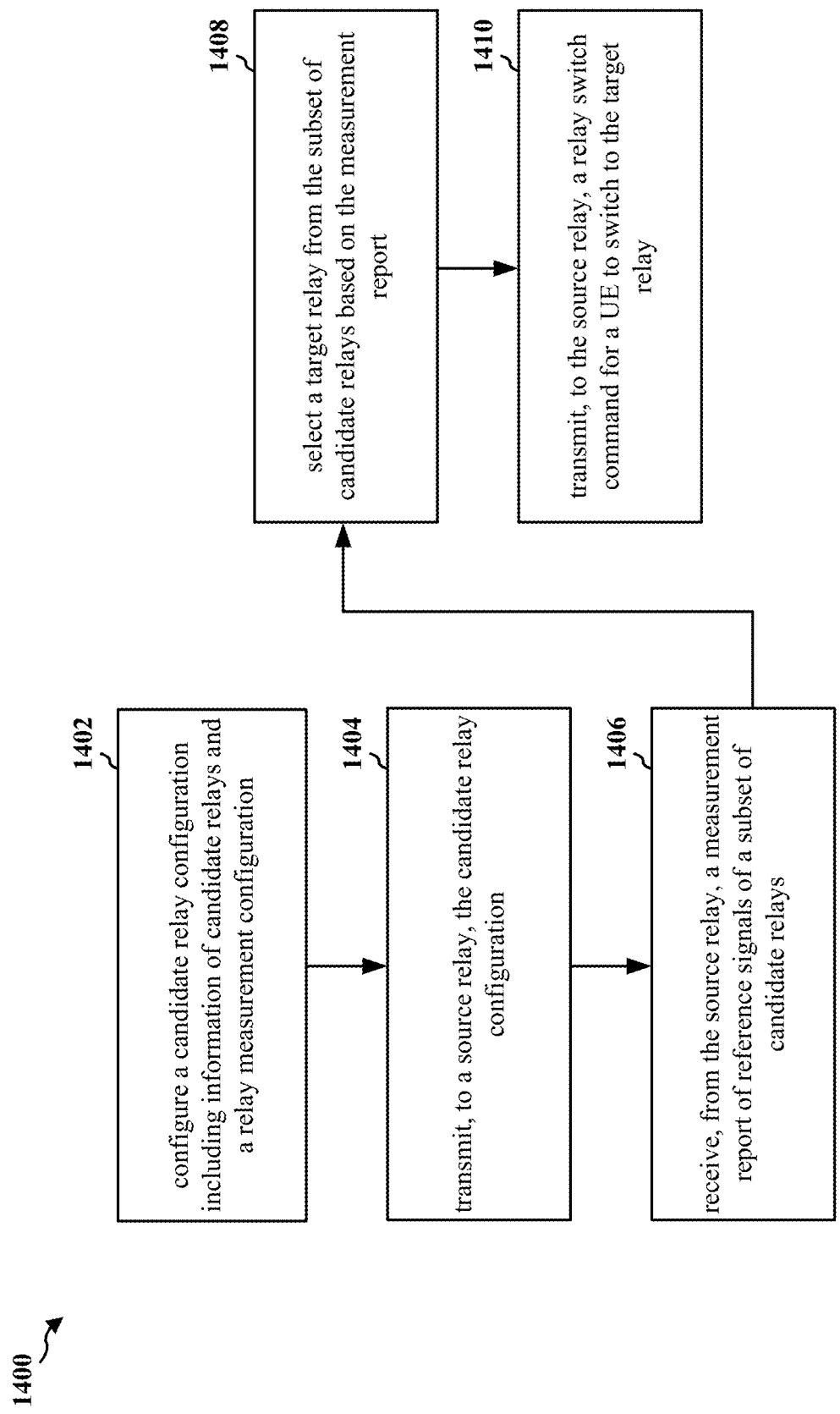
FIG. 14 is a flowchart of a method of wireless communication.

FIG. 14 is a flowchart 1400 of a method of wireless communication. The method may be performed by a base station or a component of a base station (e.g., the base station 102/180, 404, 504, 704; the apparatus 1502; the baseband unit 1504, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE with a relay measurement configuration for measuring one or more candidate relays in preparation of switching to a target relay.

At 1402, the base station may configure a candidate relay configuration including information of candidate relays and a relay measurement configuration. For example, 1402 may be performed by configuration component 1540 of apparatus 1502. The relay measurement configuration may comprise an indication of a measurement gap configuration. The indication of the measurement gap configuration may indicate whether candidate relays may be within a bandwidth configured for communication between the UE and the source relay. In some aspects, the measurement gap configuration may indicate that a measurement gap may not be utilized for reference signals from candidate relays having a same SCS as the source relay. The reference signals from the candidate relays may be within an operating bandwidth configured for communication between the UE and the source relay. Measurement resources allocated for the candidate relays may be within the bandwidth configured for communication between the UE and the source relay. The reference signals from the candidate relays may have a same numerology as the source relay. In some aspects, the measurement gap configuration may indicate that a measurement gap may be utilized for reference signals from candidate relays that may not be within the bandwidth configured for communication between the UE and the source relay. In such aspects, the reference signals from the candidate relays may not be within an operating bandwidth configured for communication between the UE and the source relay. Measurement resources allocated for the candidate relays may be configured to be outside of the bandwidth configured for communication between the UE and the source relay. In some aspects, reference signals from the candidate relays may comprise a different numerology than the source relay. A numerology used for the measurement gap may be based on a numerology of a physical channel or bandwidth associated with the source relay. In some aspects, a numerology used for the measurement gap may be based on a numerology of a reference channel associated with at least one of the candidate relays. The measurement gap may be common for reference signals from candidate relays with the same numerology.

At 1404, the base station may transmit the candidate relay configuration. For example, 1404 may be performed by candidate relay component 1542 of apparatus 1502. The base station may transmit the candidate relay configuration to the source relay.

At 1406, the base station may receive a measurement report. For example, 1406 may be performed by report component 1544 of apparatus 1502. The base station may receive the measurement report from the source relay. The measurement report may include measurements of reference signals of a subset of candidate relays. The measurement report may comprise a measurement of a Layer-1 RSRP of the source relay and the subset of candidate relays. In some aspects, the measurement report may be carried over PSCCH or PSSCH.

At 1408, the base station may select a target relay. For example, 1408 may be performed by target relay component 1546 of apparatus 1502. The base station may select the target relay from the subset of candidate relays. The base station may select the target relay from the subset of candidate relays based on the measurement report.

At 1410, the base station may transmit the relay switch command. For example, 1410 may be performed by switch component 1548 of apparatus 1502. The base station may transmit the relay switch command to the source relay. The relay switch command may be for a UE to switch to the target relay. In some aspects, the relay switch command may be transmitted via Layer-1 or Layer-2 signaling. The Layer-1 signaling may comprise control information or sidelink control information. The Layer-2 signaling may comprise MAC-CE. In some aspects, the target relay information may be indicated in the relay switch command.

Figure 15:
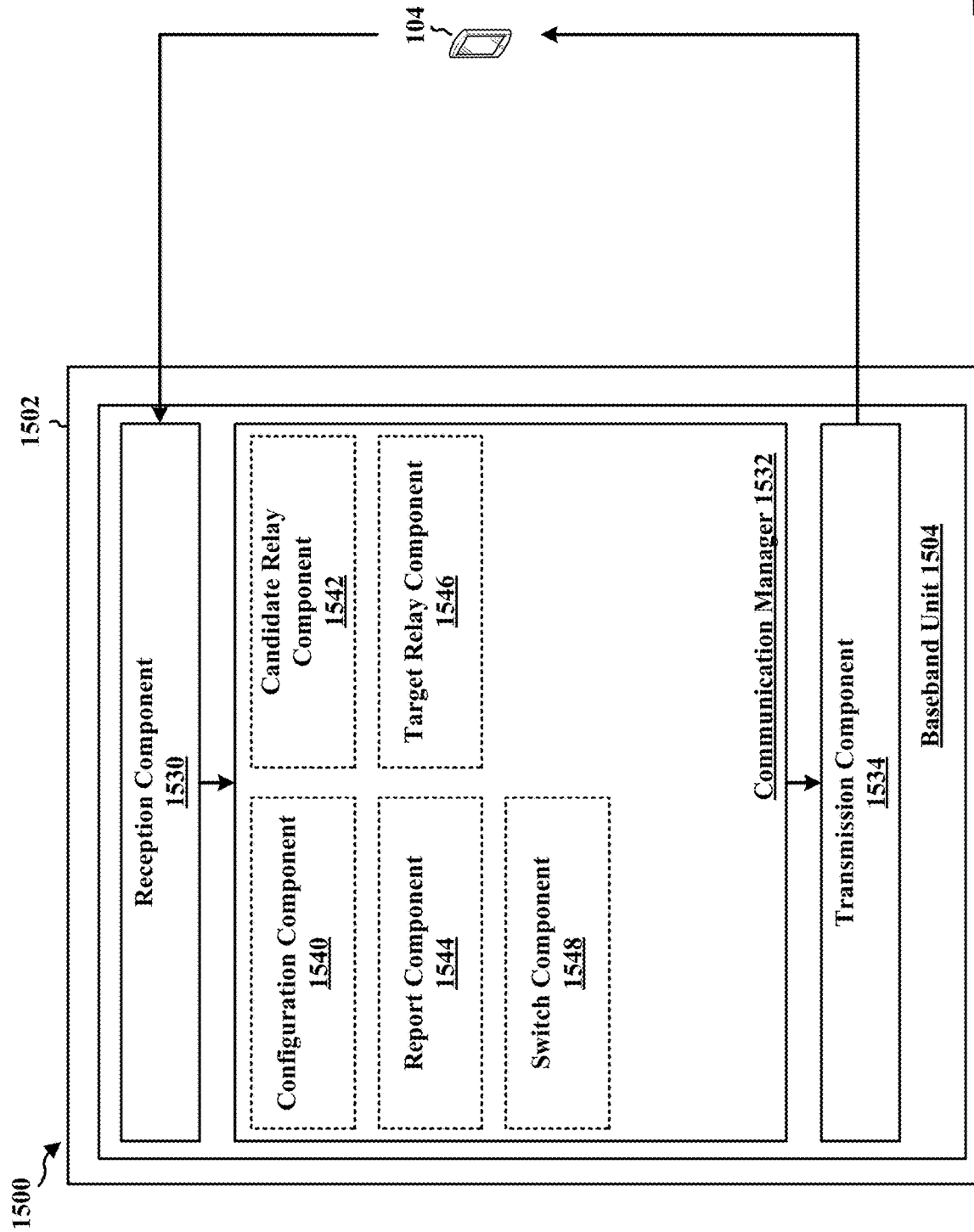
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a configuration component 1540 that may configure a candidate relay configuration including information of candidate relays and a relay measurement configuration, e.g., as described in connection with 1402 of FIG. 14. The communication manager 1532 further includes a candidate relay component 1542 that may transmit the candidate relay configuration, e.g., as described in connection with 1404 of FIG. 14. The communication manager 1532 further includes a report component 1544 that may receive a measurement report, e.g., as described in connection with 1406 of FIG. 14. The communication manager 1532 further includes a target relay component 1526 that may select a target relay, e.g., as described in connection with 1408 of FIG. 14. The communication manager 1532 further includes a switch component 1548 that may transmit the relay switch command, e.g., as described in connection with 1410 of FIG. 14.

The apparatus may include additional components that perform each of the blocks of the algorithm in the flowchart of FIG. 14. As such, each block in the flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for configuring a candidate relay configuration including information of candidate relays and a relay measurement configuration. The apparatus includes means for transmitting, to a source relay, the candidate relay configuration. The apparatus includes means for receiving, from the source relay, a measurement report of reference signals of a subset of candidate relays. The apparatus includes means for selecting a target relay from the subset of candidate relays based on the measurement report. The apparatus includes means for transmitting, to the source relay, a relay switch command for a UE to switch to the target relay. The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a source relay, a candidate relay configuration, the candidate relay configuration including information of candidate relays and a relay measurement configuration; measure a reference signal of the source relay and each of the candidate relays based on the candidate relay configuration; transmit, to the source relay, a measurement report of the reference signal of a subset of candidate relays; establishing a connection with a subset of candidate relays; and receive, from the source relay, a relay switch command to switch to a target relay from the subset of candidate relays.

Aspect 2 is the apparatus of aspect 1, further including a transceiver coupled to the at least one processor.

Aspect 3 is the apparatus of any of aspects 1 and 2, further includes that the relay measurement configuration comprises an indication of a measurement gap configuration.

Aspect 4 is the apparatus of any of aspects 1-3, further includes that the indication of the measurement gap configuration indicates whether candidate relays are within a bandwidth configured for communication between the UE and the source relay.

Aspect 5 is the apparatus of any of aspects 1-4, further includes that the measurement gap configuration is not provided for reference signals from candidate relays having a same SCS as the source relay.

Aspect 6 is the apparatus of any of aspects 1-5, further includes that the reference signals from the candidate relays are within an operating bandwidth configured for communication between the UE and the source relay.

Aspect 7 is the apparatus of any of aspects 1-6, further includes that measurement resources allocated for the candidate relays are within the bandwidth configured for communication between the UE and the source relay.

Aspect 8 is the apparatus of any of aspects 1-7, further includes that the reference signals from the candidate relays have a same numerology as the source relay.

Aspect 9 is the apparatus of any of aspects 1-8, further includes that the measurement gap configuration indicates that a measurement gap is utilized for reference signals from candidate relays that are not within the bandwidth configured for communication between the UE and the source relay.

Aspect 10 is the apparatus of any of aspects 1-9, further includes that the reference signals from the candidate relays are not within an operating bandwidth configured for communication between the UE and the source relay.

Aspect 11 is the apparatus of any of aspects 1-10, further includes that measurement resources allocated for the candidate relays are configured to be outside of the bandwidth configured for communication between the UE and the source relay.

Aspect 12 is the apparatus of any of aspects 1-11, further includes that the at least one processor is further configured to tune away from the bandwidth configured for communication between the UE and source relay to measure a reference signal from at least one candidate relay that is not within the bandwidth configured for communication between the UE and the source relay.

Aspect 13 is the apparatus of any of aspects 1-12, further includes that reference signals from the candidate relays comprise a different numerology than the source relay.

Aspect 14 is the apparatus of any of aspects 1-13, further includes that a numerology used for the measurement gap is based on a numerology of a physical channel or bandwidth associated with the source relay.

Aspect 15 is the apparatus of any of aspects 1-14, further includes that a numerology used for the measurement gap is based on a numerology of a reference channel associated with the candidate relay.

Aspect 16 is the apparatus of any of aspects 1-15, further includes that the measurement gap is common for reference signals from candidate relays with a same numerology.

Aspect 17 is the apparatus of any of aspects 1-16, further includes that the measuring the reference signal comprises measuring a DMRS of a discovery channel from the source relay and each of the candidate relays.

Aspect 18 is the apparatus of any of aspects 1-17, further includes that the measurement report comprises a measurement of a layer 1 RSRP of the source relay and the subset of candidate relays.

Aspect 19 is the apparatus of any of aspects 1-18, further includes that the measurement report is carried over PSCCH or PSSCH.

Aspect 20 is the apparatus of any of aspects 1-19, further includes that the connection with the subset of candidate relays comprises a PC5 connection.

Aspect 21 is the apparatus of any of aspects 1-20, further includes that the relay switch command is received via Layer-1 or Layer-2 signaling.

Aspect 22 is the apparatus of any of aspects 1-21, further includes that the Layer-1 signaling comprises control information or sidelink control information.

Aspect 23 is the apparatus of any of aspects 1-22, further includes that the Layer-2 signaling comprises MAC-CE.

Aspect 24 is the apparatus of any of aspects 1-23, further includes that the at least one processor is further configured to switch to the target relay as indicated in the relay switch command.

Aspect 25 is the apparatus of any of aspects 1-24, further includes that the target relay information is indicated in the relay switch command.

Aspect 26 is the apparatus of any of aspects 1-25, further includes that a base station determines the target relay from the subset of candidate relays based on the measurement report.

Aspect 27 is the apparatus of any of aspects 1-26, further includes that the source relay determines the target relay based on the measurement report.

Aspect 28 is a method of wireless communication for implementing any of aspects 1-27.

Aspect 29 is an apparatus for wireless communication including means for implementing any of aspects 1-27.

Aspect 30 is a computer-readable medium storing computer executable code, where the code when executed by a processor causes the processor to implement any of aspects 1-27.

Aspect 31 is an apparatus for wireless communication at a source relay including at least one processor coupled to a memory and configured to transmit, to a UE, a candidate relay configuration, the candidate relay configuration including information of candidate relays and a relay measurement configuration; receive, from the UE, a measurement report of a subset of candidate relays; and transmit, to the UE, a relay switch command to switch to a target relay from the subset of candidate relays.

Aspect 32 is the apparatus of aspect 31, further including a transceiver coupled to the at least one processor.

Aspect 33 is the apparatus of any of aspects 31 and 32, further includes that the at least one processor is further configured to transmit the measurement report to a base station.

Aspect 34 is the apparatus of any of aspects 31-33, further includes that the relay measurement configuration comprises an indication of a measurement gap configuration.

Aspect 35 is the apparatus of any of aspects 31-34, further includes that the indication of the measurement gap configuration indicates whether candidate relays are within a bandwidth configured for communication between the UE and the source relay.

Aspect 36 is the apparatus of any of aspects 31-35, further includes that the measurement gap configuration is not provided for reference signals from candidate relays having a same SCS as the source relay.

Aspect 37 is the apparatus of any of aspects 31-36, further includes that the reference signals from the candidate relays are within an operating bandwidth configured for communication between the UE and the source relay.

Aspect 38 is the apparatus of any of aspects 31-37, further includes that measurement resources allocated for the candidate relays are within the bandwidth configured for communication between the UE and the source relay.

Aspect 39 is the apparatus of any of aspects 31-38, further includes that the reference signals from the candidate relays have a same numerology as the source relay.

Aspect 40 is the apparatus of any of aspects 31-39, further includes that the measurement gap configuration indicates that a measurement gap is utilized for reference signals from candidate relays that are not within the bandwidth configured for communication between the UE and the source relay.

Aspect 41 is the apparatus of any of aspects 31-40, further includes that the reference signals from the candidate relays are not within an operating bandwidth configured for communication between the UE and the source relay.

Aspect 42 is the apparatus of any of aspects 31-41, further includes that measurement resources allocated for the candidate relays are configured to be outside of the bandwidth configured for communication between the UE and the source relay.

Aspect 43 is the apparatus of any of aspects 31-42, further includes that reference signals from the candidate relays comprise a different numerology than the source relay.

Aspect 44 is the apparatus of any of aspects 31-43, further includes that a numerology used for the measurement gap is based on a numerology of a physical channel or bandwidth associated with the source relay.

Aspect 45 is the apparatus of any of aspects 31-44, further includes that a numerology used for the measurement gap is based on a numerology of a reference channel associated with the candidate relay.

Aspect 46 is the apparatus of any of aspects 31-45, further includes that the measurement gap is common for reference signals from candidate relays with a same numerology.

Aspect 47 is the apparatus of any of aspects 31-46, further includes that a base station determines a list of candidates relays for the candidate relay configuration.

Aspect 48 is the apparatus of any of aspects 31-47, further includes that the at least one processor is further configured to receive, from the base station, the candidate relay configuration.

Aspect 49 is the apparatus of any of aspects 31-48, further includes that the at least one processor is further configured to determine a list of candidate relays for the candidate relay configuration.

Aspect 50 is the apparatus of any of aspects 31-49, further includes that the measurement report comprises a measurement of a Layer-1 RSRP of the source relay and the subset of candidate relays.

Aspect 51 is the apparatus of any of aspects 31-50, further includes that the measurement report is carried over PSCCH or PSSCH.

Aspect 52, the method of any of Example 31-51, further includes that the subset of candidate relays is provided to the UE in the candidate relay configuration.

Aspect 53 is the apparatus of any of aspects 31-52, further includes that the at least one processor is further configured to receive, from a base station, the relay switch command.

Aspect 54 is the apparatus of any of aspects 31-53, further includes that the relay switch command is transmitted to the UE via Layer-1 or Layer-2 signaling.

Aspect 55 is the apparatus of any of aspects 31-54, further includes that the Layer-1 signaling comprises control information or sidelink control information.

Aspect 56 is the apparatus of any of aspects 31-55, further includes that the Layer-2 signaling comprises MAC-CE.

Aspect 57 is the apparatus of any of aspects 31-56, further includes that the target relay information is indicated in the relay switch command.

Aspect 58 is the apparatus of any of aspects 31-57, further includes that the at least one processor is further configured to transmit, to a base station, the measurement report received from the UE; and receive, from the base station, an indication of a target relay from the subset of candidate relays.

Aspect 59 is the apparatus of any of aspects 31-58, further includes that the base station determines the target relay from the subset of candidate relays based on the measurement report.

Aspect 60 is the apparatus of any of aspects 31-59, further includes that the source relay determines the target relay based on the measurement report.

Aspect 61 is the apparatus of any of aspects 31-60, further includes that the source relay comprises a UE.

Aspect 62 is the apparatus of any of aspects 31-61, further includes that the source relay comprises a base station.

Aspect 63 is a method of wireless communication for implementing any of aspects 31-62.

Aspect 64 is an apparatus for wireless communication including means for implementing any of aspects 31-62.

Aspect 65 is a computer-readable medium storing computer executable code, where the code when executed by a processor causes the processor to implement any of aspects 31-62.

Aspect 66 is an apparatus for wireless communication at a base station including at least one processor coupled to a memory and configured to configure a candidate relay configuration including information of candidate relays and a relay measurement configuration; transmit, to a source relay, the candidate relay configuration; receive, from the source relay, a measurement report of reference signals of a subset of candidate relays; select a target relay from the subset of candidate relays based on the measurement report;

and transmit, to the source relay, a relay switch command for a UE to switch to the target relay.

Aspect 67 is the apparatus of aspect 66, further including a transceiver coupled to the at least one processor.

Aspect 68 is the apparatus of any of aspects 66 and 67, further includes that the relay measurement configuration comprises an indication of a measurement gap configuration.

Aspect 69 is the apparatus of any of aspects 66-68, further includes that the indication of the measurement gap configuration indicates whether candidate relays are within a bandwidth configured for communication between the UE and the source relay.

Aspect 70 is the apparatus of any of aspects 66-69 further includes that the measurement gap configuration indicates that a measurement gap is not utilized for reference signals from candidate relays having a same SCS as the source relay.

Aspect 71 is the apparatus of any of aspects 66-70 further includes that the reference signals from the candidate relays are within an operating bandwidth configured for communication between the UE and the source relay.

Aspect 72 is the apparatus of any of aspects 66-71 further includes that measurement resources allocated for the candidate relays are within the bandwidth configured for communication between the UE and the source relay.

Aspect 73 is the apparatus of any of aspects 66-72 further includes that the reference signals from the candidate relays have a same numerology as the source relay.

Aspect 74 is the apparatus of any of aspects 66-73 further includes that the measurement gap configuration indicates that a measurement gap is utilized for reference signals from candidate relays that are not within the bandwidth configured for communication between the UE and the source relay.

Aspect 75 is the apparatus of any of aspects 66-74 further includes that the reference signals from the candidate relays are not within an operating bandwidth configured for communication between the UE and the source relay.

Aspect 76 is the apparatus of any of aspects 66-75 further includes that measurement resources allocated for the candidate relays are configured to be outside of the bandwidth configured for communication between the UE and the source relay.

Aspect 77 is the apparatus of any of aspects 66-76 further includes that reference signals from the candidate relays comprise a different numerology than the source relay.

Aspect 78 is the apparatus of any of aspects 66-77 further includes that a numerology used for the measurement gap is based on a numerology of a physical channel or bandwidth associated with the source relay.

Aspect 79 is the apparatus of any of aspects 66-78 further includes that a numerology used for the measurement gap is based on a numerology of a reference channel associated with at least one of the candidate relays.

Aspect 80 is the apparatus of any of aspects 66-79 further includes that the measurement gap is common for reference signals from candidate relays with the same numerology.

Aspect 81 is the apparatus of any of aspects 66-80 further includes that the measurement report comprises a measurement of a Layer-1 RSRP of the source relay and the subset of candidate relays.

Aspect 82 is the apparatus of any of aspects 66-81 further includes that the measurement report is carried over PSCCH or PSSCH.

Aspect 83 is the apparatus of any of aspects 66-82 further includes that the relay switch command is transmitted via Layer-1 or Layer-2 signaling.

Aspect 84 is the apparatus of any of aspects 66-83 further includes that the Layer-1 signaling comprises control information or sidelink control information.

Aspect 85 is the apparatus of any of aspects 66-84 further includes that the Layer-2 signaling comprises MAC-CE.

Aspect 86 is the apparatus of any of aspects 66-85 further includes that the target relay information is indicated in the relay switch command.

Aspect 87 is a method of wireless communication for implementing any of aspects 66-86.

Aspect 88 is an apparatus for wireless communication including means for implementing any of aspects 66-86.

Aspect 89 is a computer-readable medium storing computer executable code, where the code when executed by a processor causes the processor to implement any of aspects 66-86.

What is claimed is:

1. An apparatus for wireless communication at a user equipment (UE), comprising:
a memory; and
at least one processor coupled to the memory and configured to:
receive, from a source relay, a candidate relay configuration, the candidate relay configuration including information of candidate relays and a relay measurement configuration comprising a measurement gap configuration indicating that a measurement gap is utilized for reference signals from candidate relays that are not within a bandwidth configured for communication between the UE and the source relay;
measure a reference signal of the source relay and each of the candidate relays based on the candidate relay configuration;
transmit, to the source relay, a measurement report of the reference signal of a subset of candidate relays;
establish a connection with the subset of candidate relays; and
receive, from the source relay, a relay switch command to switch to a target relay from the subset of candidate relays.

2. The apparatus of claim 1, further comprising a transceiver coupled to the at least one processor.

3. The apparatus of claim 1, wherein the measurement gap configuration is not provided for the reference signals from the candidate relays having a same sub-carrier spacing (SCS) as the source relay.

4. The apparatus of claim 1, wherein the at least one processor is further configured to:
tune away from the bandwidth configured for communication between the UE and the source relay to measure a reference signal from at least one candidate relay that is not within the bandwidth configured for communication between the UE and the source relay.

5. The apparatus of claim 1, wherein the measurement gap is common for the reference signals from the candidate relays with a same numerology.

6. The apparatus of claim 1, wherein the at least one processor is further configured to:
switch to the target relay as indicated in the relay switch command.

7. An apparatus for wireless communication at a source relay, comprising:
a memory; and
at least one processor coupled to the memory and configured to:
transmit, to a user equipment (UE), a candidate relay configuration, the candidate relay configuration including information of candidate relays and a relay measurement configuration comprising a measurement gap configuration indicating that a measurement gap is utilized for reference signals from candidate relays that are not within a bandwidth configured for communication between the UE and the source relay;
receive, from the UE, a measurement report of a subset of candidate relays; and
transmit, to the UE, a relay switch command to switch to a target relay from the subset of candidate relays.

8. The apparatus of claim 7, further comprising a transceiver coupled to the at least one processor.

9. The apparatus of claim 7, wherein the at least one processor is further configured to:
transmit the measurement report to a base station.

10. The apparatus of claim 7, wherein the measurement gap configuration is not provided for the reference signals from the candidate relays having a same sub-carrier spacing (SCS) as the source relay.

11. The apparatus of claim 7, wherein the at least one processor is further configured to:
receive, from a base station, the candidate relay configuration, wherein the base station determines a list of candidates relays for the candidate relay configuration.

12. The apparatus of claim 7, wherein the at least one processor is further configured to:
determine a list of candidate relays for the candidate relay configuration.

13. The apparatus of claim 7, wherein the at least one processor is further configured to:
receive, from a base station, the relay switch command.

14. The apparatus of claim 7, wherein the at least one processor is further configured to:
transmit, to a base station, the measurement report received from the UE; and
receive, from the base station, an indication of the target relay from the subset of candidate relays.

15. An apparatus for wireless communication at a base station, comprising:
a memory; and
at least one processor coupled to the memory and configured to:
transmit, to a source relay, a candidate relay configuration including information of candidate relays and a relay measurement configuration comprising a measurement gap configuration indicating that a measurement gap is utilized for reference signals from candidate relays that are not within a bandwidth configured for communication between a user equipment (UE) and the source relay;
receive, from the source relay, a measurement report of reference signals of a subset of candidate relays;
select a target relay from the subset of candidate relays based on the measurement report; and
transmit, to the source relay, a relay switch command for the UE to switch to the target relay.

16. The apparatus of claim 15, further comprising a transceiver coupled to the at least one processor.

17. The apparatus of claim 15, wherein the measurement gap configuration indicates that the measurement gap is not utilized for the reference signals from the candidate relays having a same sub-carrier spacing (SCS) as the source relay.

18. The apparatus of claim 15, wherein the measurement gap configuration indicates that the measurement gap is utilized for the reference signals from the candidate relays that are not within the bandwidth configured for communication between the UE and the source relay.

19. The apparatus of claim 18, wherein a numerology used for the measurement gap is based on a numerology of a physical channel or bandwidth associated with the source relay.

20. The apparatus of claim 18, wherein a numerology used for the measurement gap is based on a numerology of a reference channel associated with at least one of the candidate relays.

21. The apparatus of claim 18, wherein the measurement gap is common for the reference signals from the candidate relays with a same numerology.

22. A method of wireless communication at a user equipment (UE), comprising:
receiving, from a source relay, a candidate relay configuration, the candidate relay configuration including information of candidate relays and a relay measurement configuration comprising a measurement gap configuration indicating that a measurement gap is utilized for reference signals from candidate relays that are not within a bandwidth configured for communication between the UE and the source relay;
measuring a reference signal of the source relay and each of the candidate relays based on the candidate relay configuration;
transmitting, to the source relay, a measurement report of the reference signal of a subset of candidate relays;
establishing a connection with a subset of candidate relays; and
receiving, from the source relay, a relay switch command to switch to a target relay from the subset of candidate relays.

23. The method of claim 22, wherein the measurement gap configuration is not provided for the reference signals from the candidate relays having a same sub-carrier spacing (SCS) as the source relay.

24. The method of claim 22, further comprising:
tuning away from the bandwidth configured for communication between the UE and source relay to measure a reference signal from at least one candidate relay that is not within the bandwidth configured for communication between the UE and the source relay.

25. The method of claim 22, wherein the measurement gap is common for the reference signals from the candidate relays with a same numerology.

26. The method of claim 22, further comprising:
switching to the target relay as indicated in the relay switch command.

27. The method of claim 22, wherein the target relay information is indicated in the relay switch command.

* * * * *